(12) United States Patent
Rooyakkers

(10) Patent No.: US 10,607,000 B2
(45) Date of Patent: *Mar. 31, 2020

(54) IMAGE CAPTURE DEVICES FOR A SECURE INDUSTRIAL CONTROL SYSTEM

(71) Applicant: Bedrock Automation Platforms Inc., San Jose, CA (US)

(72) Inventor: Albert Rooyakkers, Sunnyvale, CA (US)

(73) Assignee: BEDROCK AUTOMATION PLATFORMS INC., San Jose, CA (US)

(*) Notice: Subject to any disclaimer, the term of this patent is extended or adjusted under 35 U.S.C. 154(b) by 63 days.

This patent is subject to a terminal disclaimer.

(21) Appl. No.: 15/381,667

(22) Filed: Dec. 16, 2016

(65) Prior Publication Data

US 2017/0147807 A1   May 25, 2017

Related U.S. Application Data

(63) Continuation-in-part of application No. 14/942,304, filed on Nov. 16, 2015, now Pat. No. 10,267,134, (Continued)

(51) Int. Cl.
*G06F 21/44* (2013.01)
*H04L 9/32* (2006.01)
(Continued)

(52) U.S. Cl.
CPC ......... *G06F 21/44* (2013.01); *G05B 19/0425* (2013.01); *H04L 9/0894* (2013.01); (Continued)

(58) Field of Classification Search
CPC ... G06F 21/44; H04L 63/0869; H04L 9/3263; H04N 7/183
See application file for complete search history.

(56) References Cited

U.S. PATENT DOCUMENTS 1,778,549 A   10/1930   Conner
1,961,013 A   5/1934   Saraceno
(Continued)

FOREIGN PATENT DOCUMENTS

CN   2162746 Y   4/1994
CN   1408129 A   4/2003
(Continued)

OTHER PUBLICATIONS

Roman Kleinerman; Daniel Feldman (May 2011), Power over Ethernet (PoE): An Energy-Efficient Alternative (PDF), Marvell, retrieved Sep. 25, 2018 @ http://www.marvell.com/switching/assets/Marvell-PoE-An-Energy-Efficient-Alternative.pdf (Year: 2011).*
(Continued)

*Primary Examiner* — Robert B Leung
(74) *Attorney, Agent, or Firm* — Kevin E. West; Advent, LLP

(57) ABSTRACT

An image capture device for a secure industrial control system is disclosed. In an embodiment, the image capture device includes: an image sensor; a signal processor coupled to the image sensor; and a controller for managing the signal processor and transmitting data associated with processed image signals to at least one of an input/output module or a communications/control module via a communications interface that couples the controller to the at least one of the input/output module or the communications/control module, wherein the controller is configured to establish an encrypted tunnel between the controller and the at least one of the input/output module or the communications/control module based upon at least one respective security credential of the image capture device and at least one respective security credential of the at least one of the input/output module or the communications/control module.

18 Claims, 6 Drawing Sheets

Related U.S. Application Data which is a continuation of application No. 14/469,931, filed on Aug. 27, 2014, now Pat. No. 9,191,203, which is a continuation of application No. PCT/US2013/053721, filed on Aug. 6, 2013, and a continuation-in-part of application No. 15/381,667, and a continuation-in-part of application No. 14/519,066, filed on Oct. 20, 2014, which is a continuation-in-part of application No. 15/287,937, filed on Oct. 7, 2016, now Pat. No. 9,985,789, which is a continuation of application No. 14/519,047, filed on Oct. 20, 2014, now Pat. No. 9,467,297, application No. 15/381,667, which is a continuation-in-part of application No. 14/597,498, filed on Jan. 15, 2015, now Pat. No. 9,837,205, which is a continuation of application No. 13/341,143, filed on Dec. 30, 2011, now Pat. No. 8,971,072, application No. 15/381,667, which is a continuation-in-part of application No. 15/247,998, filed on Aug. 26, 2016, now Pat. No. 9,600,434, which is a continuation of application No. 14/501,974, filed on Sep. 30, 2014, now Pat. No. 9,436,641, which is a continuation of application No. 13/341,161, filed on Dec. 30, 2011, now Pat. No. 8,862,802, application No. 15/381,667, which is a continuation-in-part of application No. 15/289,613, filed on Oct. 10, 2016, now Pat. No. 9,632,964, which is a continuation of application No. 14/502,006, filed on Sep. 30, 2014, now Pat. No. 9,465,762, which is a continuation of application No. 13/341,176, filed on Dec. 30, 2011, now Pat. No. 8,868,813.

(51) Int. Cl.
*H04N 7/18* (2006.01)
*H04L 29/06* (2006.01)
*H04L 9/08* (2006.01)
*G05B 19/042* (2006.01)

(52) U.S. Cl.
CPC .......... *H04L 9/3231* (2013.01); *H04L 9/3247* (2013.01); *H04L 9/3263* (2013.01); *H04L 63/0823* (2013.01); *H04L 63/0861* (2013.01); *H04L 63/0869* (2013.01); *H04N 7/183* (2013.01); *G05B 2219/2651* (2013.01)

(56) References Cited

U.S. PATENT DOCUMENTS

| | | |
|---|---|---|
| 2,540,575 A | 2/1951 | Finizie |
| 3,702,983 A | 11/1972 | Chace et al. |
| 4,079,440 A | 3/1978 | Ohnuma et al. |
| 4,082,984 A | 4/1978 | Iwata |
| 4,337,499 A | 6/1982 | Cronin et al. |
| 4,403,286 A | 9/1983 | Fry et al. |
| 4,508,414 A | 4/1985 | Kusui et al. |
| 4,628,308 A | 12/1986 | Robert |
| 4,656,622 A | 4/1987 | Lea |
| 4,691,384 A | 9/1987 | Jobe |
| 4,882,702 A | 11/1989 | Stuger et al. |
| 4,929,939 A | 5/1990 | Varma et al. |
| 4,932,892 A | 6/1990 | Hatch |
| 5,013,247 A | 5/1991 | Watson |
| 5,229,652 A | 7/1993 | Hough |
| 5,325,046 A | 6/1994 | Young et al. |
| 5,378,166 A | 1/1995 | Gallagher, Sr. |
| 5,385,487 A | 1/1995 | Beitman |
| 5,385,490 A | 1/1995 | Demeter et al. |
| 5,388,099 A | 2/1995 | Poole |
| 5,422,558 A | 6/1995 | Stewart |
| 5,469,334 A | 11/1995 | Balakrishnan |
| 5,519,583 A | 5/1996 | Kolling et al. |
| 5,546,463 A | 8/1996 | Caputo et al. |
| 5,590,284 A | 12/1996 | Crosetto |
| 5,602,754 A | 2/1997 | Beatty et al. |
| 5,603,044 A | 2/1997 | Annapareddy et al. |
| 5,719,483 A | 2/1998 | Abbott et al. |
| 5,735,707 A | 4/1998 | O'Groske et al. |
| 5,773,962 A | 6/1998 | Nor |
| 5,860,824 A | 1/1999 | Fan |
| 5,896,473 A | 4/1999 | Kaspari |
| 5,909,368 A | 6/1999 | Nixon et al. |
| 5,951,666 A | 9/1999 | Ilting et al. |
| 5,958,030 A | 9/1999 | Kwa |
| 5,980,312 A | 11/1999 | Chapman et al. |
| 6,009,410 A | 12/1999 | LeMole et al. |
| 6,046,513 A | 4/2000 | Jouper et al. |
| 6,124,778 A | 9/2000 | Rowley et al. |
| 6,178,474 B1 | 1/2001 | Hamano et al. |
| 6,219,789 B1 | 4/2001 | Little et al. |
| 6,220,889 B1 | 4/2001 | Ely et al. |
| 6,347,963 B1 | 2/2002 | Falkenberg et al. |
| 6,435,409 B1 | 8/2002 | Hu |
| 6,453,416 B1 | 9/2002 | Epstein |
| 6,480,963 B1 | 11/2002 | Tachibana et al. |
| 6,490,176 B2 | 12/2002 | Holzer et al. |
| 6,574,681 B1 | 6/2003 | White et al. |
| 6,597,683 B1 | 7/2003 | Gehring et al. |
| 6,643,777 B1 | 11/2003 | Chu |
| 6,680,904 B1 | 1/2004 | Kaplan et al. |
| 6,695,620 B1 | 2/2004 | Huang |
| 6,799,234 B1 | 9/2004 | Moon et al. |
| 6,812,803 B2 | 11/2004 | Goergen |
| 6,814,580 B2 | 11/2004 | Li et al. |
| 6,828,894 B1 | 12/2004 | Sorger et al. |
| 6,840,795 B1 | 1/2005 | Takeda et al. |
| 6,988,162 B2 | 1/2006 | Goergen |
| 7,164,255 B2 | 1/2007 | Hui |
| 7,172,428 B2 | 2/2007 | Huang |
| 7,200,692 B2 | 4/2007 | Singla et al. |
| 7,234,963 B1 | 6/2007 | Huang |
| 7,254,452 B2 | 8/2007 | Davlin et al. |
| 7,402,074 B2 | 7/2008 | LeBlanc et al. |
| 7,415,368 B2 | 8/2008 | Gilbert et al. |
| 7,426,585 B1 | 9/2008 | Rourke |
| 7,460,482 B2 | 12/2008 | Pike |
| 7,510,420 B2 | 3/2009 | Mori |
| 7,526,676 B2 | 4/2009 | Chou et al. |
| 7,529,862 B2 | 5/2009 | Isani et al. |
| 7,536,548 B1 | 5/2009 | Batke et al. |
| 7,554,288 B2 | 6/2009 | Gangstoe et al. |
| 7,587,481 B1 | 9/2009 | Osburn, III |
| 7,614,909 B2 | 11/2009 | Lin |
| 7,619,386 B2 | 11/2009 | Sasaki et al. |
| 7,622,994 B2 | 11/2009 | Galal |
| 7,660,998 B2 | 2/2010 | Walmsley |
| 7,670,190 B2 | 3/2010 | Shi et al. |
| 7,685,349 B2 | 3/2010 | Allen et al. |
| 7,730,304 B2 | 6/2010 | Katsube et al. |
| 7,746,846 B2 | 6/2010 | Boora et al. |
| 7,761,640 B2 | 7/2010 | Hikabe |
| 7,774,074 B2 | 8/2010 | Davlin et al. |
| 7,790,304 B2 | 9/2010 | Hendricks et al. |
| 7,811,136 B1 | 10/2010 | Hsieh et al. |
| 7,815,471 B2 | 10/2010 | Wu |
| 7,822,994 B2 | 10/2010 | Hamaguchi |
| 7,839,025 B2 | 11/2010 | Besser et al. |
| 7,872,561 B2 | 1/2011 | Matumoto |
| 7,948,758 B2 | 5/2011 | Buhler et al. |
| 7,960,870 B2 | 6/2011 | Besser et al. |
| 7,971,052 B2 | 6/2011 | Lucas et al. |
| 8,013,474 B2 | 9/2011 | Besser et al. |
| 8,019,194 B2 | 9/2011 | Morrison et al. |
| 8,032,745 B2 | 10/2011 | Bandholz et al. |
| 8,062,070 B2 | 11/2011 | Jeon et al. |
| 8,125,208 B2 | 2/2012 | Gyland |
| 8,132,231 B2 | 3/2012 | Amies et al. |
| 8,143,858 B2 | 3/2012 | Tsugawa et al. |
| 8,149,587 B2 | 4/2012 | Baran et al. |
| 8,157,569 B1 | 4/2012 | Liu |

(56) References Cited

U.S. PATENT DOCUMENTS

| | | | |
|---|---|---|---|
| 8,181,262 B2 | 5/2012 | Cooper et al. |
| 8,189,101 B2 | 5/2012 | Cummings et al. |
| 8,212,399 B2 | 7/2012 | Besser et al. |
| 8,266,360 B2 | 9/2012 | Agrawal |
| 8,281,386 B2 | 10/2012 | Milligan et al. |
| 8,287,306 B2 | 10/2012 | Daugherty et al. |
| 8,295,770 B2 | 10/2012 | Seil et al. |
| 8,310,380 B2 | 11/2012 | Aria et al. |
| 8,380,905 B2 | 2/2013 | Djabbari et al. |
| 8,390,441 B2 | 3/2013 | Covaro et al. |
| 8,465,762 B2 | 6/2013 | Lee et al. |
| 8,480,438 B2 | 7/2013 | Mattson |
| 8,560,147 B2 | 10/2013 | Taylor et al. |
| 8,587,318 B2 | 11/2013 | Chandler et al. |
| 8,651,874 B2 | 2/2014 | Ku et al. |
| 8,694,770 B1 | 4/2014 | Osburn, III |
| 8,777,671 B2 | 7/2014 | Huang |
| 8,862,802 B2 | 10/2014 | Calvin et al. |
| 8,868,813 B2 | 10/2014 | Calvin et al. |
| 8,971,072 B2 | 3/2015 | Calvin et al. |
| 9,071,082 B2 | 6/2015 | Nishibayashi et al. |
| 9,318,917 B2 | 4/2016 | Kubota et al. |
| 9,436,641 B2 | 9/2016 | Calvin et al. |
| 9,465,762 B2 | 10/2016 | Calvin et al. |
| 9,812,803 B2 | 11/2017 | Toyoda et al. |
| 10,103,875 B1 | 10/2018 | Roth et al. |
| 2002/0070835 A1 | 6/2002 | Dadafshar |
| 2002/0084698 A1 | 7/2002 | Kelly et al. |
| 2002/0086678 A1 | 7/2002 | Salokannel et al. |
| 2002/0095573 A1 | 7/2002 | O'Brien |
| 2002/0097031 A1 | 7/2002 | Cook et al. |
| 2002/0116619 A1 | 8/2002 | Maruyama et al. |
| 2002/0171525 A1 | 11/2002 | Kobayashi et al. |
| 2002/0182898 A1 | 12/2002 | Takahashi et al. |
| 2002/0189910 A1 | 12/2002 | Yano et al. |
| 2003/0005289 A1 | 1/2003 | Gougeon et al. |
| 2003/0040897 A1 | 2/2003 | Murphy et al. |
| 2003/0074489 A1 | 4/2003 | Steger et al. |
| 2003/0094855 A1 | 5/2003 | Lohr et al. |
| 2003/0105601 A1 | 6/2003 | Kobayashi et al. |
| 2003/0137277 A1 | 7/2003 | Mori et al. |
| 2003/0166397 A1 | 9/2003 | Aura |
| 2003/0202330 A1 | 10/2003 | Lopata et al. |
| 2003/0204756 A1 | 10/2003 | Ransom et al. |
| 2005/0001589 A1 | 1/2005 | Edington et al. |
| 2005/0019143 A1 | 1/2005 | Bishman |
| 2005/0091432 A1 | 4/2005 | Adams et al. |
| 2005/0102535 A1 | 5/2005 | Patrick et al. |
| 2005/0144437 A1 | 6/2005 | Ransom et al. |
| 2005/0144440 A1 | 6/2005 | Catherman et al. |
| 2005/0162019 A1 | 7/2005 | Masciarelli et al. |
| 2005/0182876 A1 | 8/2005 | Kim et al. |
| 2005/0189910 A1 | 9/2005 | Hui |
| 2005/0229004 A1 | 10/2005 | Callaghan |
| 2006/0020782 A1 | 1/2006 | Kakii |
| 2006/0108972 A1 | 5/2006 | Araya |
| 2006/0119315 A1 | 6/2006 | Sasaki et al. |
| 2006/0155990 A1 | 7/2006 | Katsube et al. |
| 2006/0156415 A1 | 7/2006 | Rubinstein et al. |
| 2007/0072442 A1 | 3/2007 | DiFonzo et al. |
| 2007/0076768 A1 | 4/2007 | Chiesa et al. |
| 2007/0123316 A1 | 5/2007 | Little |
| 2007/0143838 A1 | 6/2007 | Milligan et al. |
| 2007/0174524 A1 | 7/2007 | Kato et al. |
| 2007/0177298 A1 | 8/2007 | Jaatinen et al. |
| 2007/0194944 A1* | 8/2007 | Galera ................. F16P 3/14 340/686.6 |
| 2007/0214296 A1 | 9/2007 | Takamatsu et al. |
| 2007/0229302 A1 | 10/2007 | Penick et al. |
| 2007/0260897 A1 | 11/2007 | Cochran et al. |
| 2008/0067874 A1 | 3/2008 | Tseng |
| 2008/0077976 A1 | 3/2008 | Schulz |
| 2008/0123669 A1 | 5/2008 | Oliveti et al. |
| 2008/0140888 A1 | 6/2008 | Blair et al. |
| 2008/0181316 A1 | 7/2008 | Crawley et al. |
| 2008/0189441 A1 | 8/2008 | Jundt et al. |
| 2008/0194124 A1 | 8/2008 | Di Stefano |
| 2008/0303351 A1 | 12/2008 | Jansen et al. |
| 2009/0036164 A1 | 2/2009 | Rowley |
| 2009/0061678 A1 | 3/2009 | Minoo et al. |
| 2009/0066291 A1 | 3/2009 | Tien et al. |
| 2009/0083843 A1 | 3/2009 | Wilkinson, Jr. et al. |
| 2009/0091513 A1 | 4/2009 | Kuhn |
| 2009/0092248 A1 | 4/2009 | Rawson |
| 2009/0121704 A1 | 5/2009 | Shibahara |
| 2009/0204458 A1 | 8/2009 | Wiese et al. |
| 2009/0217043 A1 | 8/2009 | Metke et al. |
| 2009/0222885 A1 | 9/2009 | Batke et al. |
| 2009/0234998 A1 | 9/2009 | Kuo |
| 2009/0239468 A1 | 9/2009 | He et al. |
| 2009/0245245 A1 | 10/2009 | Malwankar et al. |
| 2009/0254655 A1 | 10/2009 | Kidwell et al. |
| 2009/0256717 A1 | 10/2009 | Iwai |
| 2009/0278509 A1 | 11/2009 | Boyles et al. |
| 2009/0287321 A1 | 11/2009 | Lucas et al. |
| 2009/0288732 A1 | 11/2009 | Gielen |
| 2010/0052428 A1 | 3/2010 | Imamura et al. |
| 2010/0066340 A1 | 3/2010 | Delforge |
| 2010/0082869 A1 | 4/2010 | Lloyd et al. |
| 2010/0122081 A1 | 5/2010 | Sato et al. |
| 2010/0149997 A1 | 6/2010 | Law et al. |
| 2010/0151816 A1 | 6/2010 | Besehanic et al. |
| 2010/0153751 A1* | 6/2010 | Tseng ................. H04L 12/40032 713/300 |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0066309 A1 | 3/2011 | Matsuoka et al. |
| 2011/0074349 A1 | 3/2011 | Ghovanloo |
| 2011/0080056 A1 | 4/2011 | Low et al. |
| 2011/0082621 A1 | 4/2011 | Berkobin et al. |
| 2011/0089900 A1 | 4/2011 | Hogari |
| 2011/0140538 A1 | 6/2011 | Jung et al. |
| 2011/0185196 A1 | 7/2011 | Asano et al. |
| 2011/0196997 A1 | 8/2011 | Ruberg et al. |
| 2011/0197009 A1 | 8/2011 | Agrawal |
| 2011/0202992 A1 | 8/2011 | Xiao et al. |
| 2011/0285847 A1* | 11/2011 | Riedel ................. A61N 1/39 348/143 |
| 2011/0291491 A1 | 12/2011 | Lemmens et al. |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1 | 6/2012 | Hosaka |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1 | 11/2012 | Ku et al. |
| 2012/0284354 A1 | 11/2012 | Mukundan et al. |
| 2012/0295451 A1 | 11/2012 | Hyun-Jun et al. |
| 2012/0297101 A1 | 11/2012 | Neupartl et al. |
| 2012/0311071 A1 | 12/2012 | Karaffa et al. |
| 2013/0011719 A1 | 1/2013 | Yasui et al. |
| 2013/0026973 A1 | 1/2013 | Luke et al. |
| 2013/0031382 A1 | 1/2013 | Jau et al. |
| 2013/0070788 A1 | 3/2013 | Deiretsbacher et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0091623 A1 | 3/2014 | Shippy et al. |

(56) References Cited

U.S. PATENT DOCUMENTS

| | | | |
|---|---|---|---|
| 2014/0095867 A1 | 4/2014 | Smith et al. |
| 2014/0097672 A1 | 4/2014 | Takemura et al. |
| 2014/0129162 A1 | 5/2014 | Hallman et al. |
| 2014/0142725 A1 | 5/2014 | Boyd |
| 2014/0280520 A1 | 9/2014 | Baier et al. |
| 2014/0285318 A1 | 9/2014 | Audeon et al. |
| 2014/0312913 A1 | 10/2014 | Kikuchi et al. |
| 2014/0327318 A1 | 11/2014 | Calvin et al. |
| 2014/0335703 A1 | 11/2014 | Calvin et al. |
| 2014/0341220 A1 | 11/2014 | Lessmann |
| 2015/0046701 A1 | 2/2015 | Rooyakkers et al. |
| 2015/0048684 A1 | 2/2015 | Rooyakkers et al. |
| 2015/0115711 A1 | 4/2015 | Kouroussis et al. |
| 2015/0365240 A1 | 12/2015 | Callaghan |
| 2016/0065656 A1 | 3/2016 | Patin et al. |
| 2016/0069174 A1 | 3/2016 | Cannan et al. |
| 2016/0172635 A1 | 6/2016 | Stimm et al. |
| 2016/0224048 A1 | 8/2016 | Rooyakkers et al. |
| 2016/0301695 A1 | 10/2016 | Trivelpiece et al. |
| 2018/0190427 A1 | 7/2018 | Rooyakkers et al. |

FOREIGN PATENT DOCUMENTS

| | | |
|---|---|---|
| CN | 1440254 A | 9/2003 |
| CN | 1571335 A | 1/2005 |
| CN | 1702582 A | 11/2005 |
| CN | 1839581 A | 9/2006 |
| CN | 101005359 A | 7/2007 |
| CN | 101069407 A | 11/2007 |
| CN | 101262401 A | 9/2008 |
| CN | 101322089 A | 12/2008 |
| CN | 101447861 A | 6/2009 |
| CN | 101533380 A | 9/2009 |
| CN | 101576041 A | 11/2009 |
| CN | 201515041 U | 6/2010 |
| CN | 101809557 A | 8/2010 |
| CN | 101919139 A | 12/2010 |
| CN | 101977104 A | 2/2011 |
| CN | 102035220 A | 4/2011 |
| CN | 102237680 A | 11/2011 |
| CN | 202205977 U | 4/2012 |
| CN | 102480352 A | 5/2012 |
| CN | 1934766 B | 6/2012 |
| CN | 102546707 A | 7/2012 |
| CN | 102809950 A | 12/2012 |
| CN | 102812578 A | 12/2012 |
| CN | 103376766 A | 10/2013 |
| CN | 103682883 A | 3/2014 |
| CN | 103701919 A | 4/2014 |
| CN | 104025387 A | 9/2014 |
| CN | 203932181 U | 11/2014 |
| CN | 104185969 A | 12/2014 |
| CN | 204243110 U | 4/2015 |
| CN | 105556762 A | 5/2016 |
| CN | 104025387 B | 7/2018 |
| DE | 102013213550 A | 1/2015 |
| EP | 473336 A2 | 4/1992 |
| EP | 0507360 A2 | 10/1992 |
| EP | 1176616 A2 | 1/2002 |
| EP | 1241800 A1 | 9/2002 |
| EP | 1246563 A1 | 10/2002 |
| EP | 1571559 A1 | 7/2005 |
| EP | 1877915 A2 | 1/2008 |
| EP | 1885085 A1 | 2/2008 |
| EP | 1885085 B1 | 6/2008 |
| EP | 2179364 A2 | 4/2010 |
| EP | 2317743 A1 | 5/2011 |
| EP | 2450921 A1 | 5/2012 |
| EP | 2557657 A2 | 2/2013 |
| EP | 2557670 A2 | 2/2013 |
| EP | 2613421 A1 | 10/2013 |
| EP | 2777796 A1 | 9/2014 |
| EP | 2806319 A2 | 11/2014 |
| JP | S59-074413 | 5/1984 |
| JP | S59177226 U | 11/1984 |
| JP | H0163190 U | 4/1989 |
| JP | 04245411 A | 9/1992 |
| JP | H05346809 A | 12/1993 |
| JP | 07105328 A | 4/1995 |
| JP | 07320963 A | 12/1995 |
| JP | 08037121 | 2/1996 |
| JP | 08-098274 | 4/1996 |
| JP | 08241824 A | 9/1996 |
| JP | 08322252 A | 12/1996 |
| JP | 09182324 A | 7/1997 |
| JP | 11-89103 A | 3/1999 |
| JP | 11098707 A | 4/1999 |
| JP | 11-235044 | 8/1999 |
| JP | H11230504 A | 8/1999 |
| JP | H11312013 A | 11/1999 |
| JP | 2000252143 A | 9/2000 |
| JP | 2001292176 A | 10/2001 |
| JP | 2001307055 A | 11/2001 |
| JP | 2002280238 A | 9/2002 |
| JP | 2002343655 A | 11/2002 |
| JP | 2002359131 A | 12/2002 |
| JP | 3370931 B2 | 1/2003 |
| JP | 2003047912 A | 2/2003 |
| JP | 2003068543 A | 3/2003 |
| JP | 2003142327 A | 5/2003 |
| JP | 2003152703 A | 5/2003 |
| JP | 2003152708 A | 5/2003 |
| JP | 2003216237 A | 7/2003 |
| JP | 2004501540 A | 1/2004 |
| JP | 2004303701 A | 10/2004 |
| JP | 2005038411 A | 2/2005 |
| JP | 2005513956 A | 5/2005 |
| JP | 2005250833 A | 9/2005 |
| JP | 2005275777 A | 10/2005 |
| JP | 2005531235 A | 10/2005 |
| JP | 2005327231 A | 11/2005 |
| JP | 2005332406 A | 12/2005 |
| JP | 2006060779 A | 3/2006 |
| JP | 2006180460 A | 7/2006 |
| JP | 2006223950 A | 8/2006 |
| JP | 2006238274 A | 9/2006 |
| JP | 2007034711 A | 2/2007 |
| JP | 2007096817 A | 4/2007 |
| JP | 2007519150 A | 7/2007 |
| JP | 2007238696 A | 9/2007 |
| JP | 2007252081 A | 9/2007 |
| JP | 2008215028 A | 9/2008 |
| JP | 2008257707 A | 10/2008 |
| JP | 2008538668 A | 10/2008 |
| JP | 4245411 B2 | 3/2009 |
| JP | 2009157913 A | 7/2009 |
| JP | 2010503134 A | 1/2010 |
| JP | 4439340 B2 | 3/2010 |
| JP | 2010515407 A | 5/2010 |
| JP | 2010135903 A | 6/2010 |
| JP | 2011217037 A | 10/2011 |
| JP | 2011223544 A | 11/2011 |
| JP | 5013019 B1 | 8/2012 |
| JP | 2012190583 A | 10/2012 |
| JP | 2013021798 A | 1/2013 |
| JP | 2013170258 A | 9/2013 |
| JP | 2014507721 A | 3/2014 |
| JP | 2014080952 A | 5/2014 |
| JP | 2015023375 A | 2/2015 |
| JP | 2016512039 A | 4/2016 |
| JP | 6189479 B1 | 8/2017 |
| KR | 20020088540 A | 11/2002 |
| KR | 20050014790 A | 2/2005 |
| KR | 1020060034244 A | 4/2006 |
| KR | 100705380 B1 | 4/2007 |
| KR | 100807377 B1 | 2/2008 |
| TW | 201310344 A | 3/2013 |
| WO | 2005070733 A1 | 8/2005 |
| WO | 2006059195 A1 | 6/2006 |
| WO | 2007041866 A1 | 4/2007 |
| WO | 2007148462 A1 | 12/2007 |
| WO | 2008083387 A2 | 7/2008 |
| WO | 2009032797 A2 | 3/2009 |
| WO | 2011104935 A1 | 9/2011 |

(56) References Cited

FOREIGN PATENT DOCUMENTS

| WO | 2013033247 A1 | 3/2013 |
|---|---|---|
| WO | 2013102069 A1 | 7/2013 |
| WO | 2014179556 A1 | 11/2014 |
| WO | 2014179566 A1 | 11/2014 |
| WO | 2015020633 A1 | 2/2015 |

OTHER PUBLICATIONS

CGI, White Paper on "Public Key Encryption and Digital Signature: How do they work?", 2004 (refer to pp. 3-4).
"Introduction to Cryptography", Network Associates, Inc., PGP 6.5.1, 1990-1999, Retrieved @ [ftp://ftp.pgpi.org/pub/pgp/6.5/docs/English/IntroToCrypto.pdf] on Mar. 17, 2016 (refer to pp. 16-20).
Stouffer, K. et al., "Guide to Industrial Control Systems (ICS) Security", NIST, Special Pub. 800-82, Jun. 2011 (refer to pp. 2-1 to 2-10).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.
Rodrigues, Aniket et al., "SCADA security device", Proceedings of the Seventh Annual Workshop on Cyber Security and Information Intelligence Research, CSIIRW '11, Jan. 1, 2011, p. 1, XP55230335, New York, New York, USA.
Rodrigues, A., "SCADA Security Device: Design and Implementation", Master of Science Thesis, Wichita State University, Dec. 2011.
Zafirovic-Vukotic, M. et al., "Secure SCADA network supporting NERC CIP", Power & Energy Society General Meeting, 2009, PES '09, IEEE, Piscataway, NJ, USA, Jul. 26, 2009, pp. 1-8, XP031538542.
European Search Report dated Dec. 2, 2015 for EP Application No. 14196408.0.
International Search Report and Written Opinion of the International Searching Authority dated Apr. 29, 2013, International Application No. PCT/US2012/072056.
Office Action dated Aug. 3, 2016 for Chinese Appln. No. 201280065564.2.
Office Action dated Dec. 2, 2016 for JP Appln. No. 2014-550508.
Office Action dated May 17, 2013 for U.S. Appl. No. 13/341,161.
Partial Supplementary European Search Report dated Nov. 10, 2015 in Application # EP12862174.5.
Office Action for Japanese Application No. 2016-512039, dated Feb. 5, 2019.
International Search Report and Written Opinion for PCT/US2014/036368, dated Sep. 12, 2014.
Office Action for Chinese Appln No. 201380079515.9, dated Nov. 16, 2017.
Office Action for Chinese Appln No. 201380079515.9 dated Aug. 7, 2018.
Office Action for Chinese Appln No. 201380079515.9, dated Feb. 25, 2019.
Supplementary Search Report in European Application No. 13890953.6, dated Jan. 26, 2017.
Office Action for Japanese Application No. 2016-533280, dated Jun. 28, 2017.
Office Action for Japanese Application No. 2016-533280, dated Apr. 11, 2018.
Office Action for Japanese Application No. 2016-533280, dated Jan. 7, 2019.
International Search Report and Written Opinion for PCT/US2013/053721, dated May 12, 2014.
Office Action for Chinese Appln No. 201380079514.4, dated Feb. 5, 2018.
Office Action for Chinese Appln No. 201380079514.4, dated Nov. 5, 2018.
Examination Report for European Application No. 13891327.2, dated Sep. 26, 2018.
Supplementary Search Report for European Application No. 13891327.2, dated Jan. 10, 2017.
Reason for Rejection in Japanese Patent Application No. 2016-533279, dated Aug. 13, 2018.
Notice of Reasons for Rejection in Japanese Patent Application No. 2016-533279, dated Jul. 13, 2017.
Notice of Reason for Rejection in Japanese Patent Application No. 2016-533279, dated Mar. 1, 2018.
Fabien Fleuot, "Raspberry Pi + Mihini, Controlling an off-the-grid Electrical Installation, Part I," Apr. 11, 2014, XP055290314.
Siemens, "Uninterruptible 24 V DC Power Supply High-Performance, communicative and integrated in TIA," Mar. 31, 2015, XP055290324.
Office Action for Canadian Application No. 2,875,517, dated May 4, 2015.
Office Action for Chinese Application No. 201410802889.5, dated Jul. 26, 2018.
Search Report for European Application No. 14196406.4, dated Nov. 4, 2015.
Extended Search Report for European Application No. 16165112.0, dated Sep. 6, 2016.
Examination Report for European Application No. 16165112.0, dated Feb. 16, 2018.
Notice of Reason for Rejection for Japanese Application No. 2014-243827, dated Jan. 24, 2019.
Office Action for Chinese Application No. 2015103905202.2, dated Jun. 20, 2018.
Office Action for Chinese Application No. 2015103905202.2, dated Mar. 6, 2019.
Search Report for European Application No. 15175744.0, dated Apr. 26, 2016.
Partial Search Report for European Application No. 15175744.0, dated Dec. 14, 2015.
Office Action for Canadian Application No. 2,875,518, dated Jun. 3, 2015.
Office Action for Canadian Application No. 2,875,518, dated Apr. 22, 2016.
Office Action for Canadian Application No. 2,875,515, dated Jul. 5, 2017.
Office Action for Canadian Application No. 2,875,515, dated Feb. 10, 2017.
Office Action for Canadian Application No. 2,875,515, dated Jun. 1, 2016.
Office Action for Canadian Application No. 2,875,515, dated Oct. 6, 2016.
Office Action for Chinese Application No. 201410799473.2, dated Oct. 12, 2018.
Examination Report for European Application No. 14196409.8, dated Jan. 22, 2018.
Search Report for European Application No. 14196409.8, dated May 19, 2016.
Notice of Reason for Rejection for Japanese Application No. 2014-243830, dated Sep. 21, 2018.
Office Action for Canadian Application No. 2,920,133, dated Jan. 30, 2017.
Office Action for Canadian Application No. 2,920,133, dated Oct. 19, 2016.
Search Report for European Application No. 16154943.1, dated Jun. 17, 2016.
Partial European Search Report in European Application No. 17208183.8, dated Mar. 28, 2018.
Examination Report in European Application No. 17206183.8, dated Jun. 22, 2018.
Examination Report in European Application No. 17208183.8, dated Feb. 27, 2019.
Office Action for Chinese Appln. No. 201610239130.X, dated Feb. 14, 2018.
Office Action for Chinese Appln. No. 201610239130.X, dated Aug. 2, 2017.
Office Action for CN Appln. No. 201410182071.8, dated Mar. 1, 2017.
Office Action for Chinese Application No. 201280065564.2, dated Feb. 28, 2017.
Office Action for Chinese Application No. 201280065564.2, dated Oct. 19, 2017.

(56) References Cited

OTHER PUBLICATIONS

European Search Report in Application No. 12862174.5, dated Feb. 15, 2016.
European Search Report in Application No. 17178867.2, dated Nov. 2, 2017.
Office Action for Japanese Application No. 2014-550508, dated Sep. 15, 2017.
Baran, M.E. et al., "Overcurrent Protection on Voltage-Source-Converter-Based Multiterminal DC Distribution Systems," IEEE Transactions on Power Delivery, Jan. 2007.
Office Action for Chinese Application No. 201410383686.7, dated May 31, 2017.
Office Action for Chinese Application No. 201410383686.7, dated Feb. 23, 2018.
Office Action for Chinese Application No. 201480034066.0, dated May 3, 2017.
Search Report and Opinion for European Application No. 14166908.8, dated Jan. 7, 2015.
Extended Search Report for European Application No. 14180106.8, dated Jul. 13, 2015.
Examination Report for European Application No. 14180106.8, dated Jun. 28, 2017.
Supplementary Search Report for European Application No. 14791210.9, dated Dec. 6, 2016.
Office Action for Japanese Application No. 2014-080952, dated May 2, 2018.
Office Action for Japanese Application No. 2014-080952, dated Jan. 7, 2019.
Office Action for Japanese Application No. 2014-159475, dated Jul. 18, 2018.
Office Action for Japanese Application No. 2014-159475, dated Feb. 15, 2019.
Office Action for Japanese Application No. 2016-512039, dated Jun. 5, 2018.
Canadian Office Action for Application No. 2920133 dated Jan. 30, 2017.
Chinese Office Action for Application No. 2920133 dated Oct. 19, 2016.
Supplementary European Search Report for European Patent Application No. EP 13890953 dated Feb. 6, 2017, 9 pages.
Supplementary Search Report for European Application No. 14791210.9, dated Dec. 16, 2016.
Siemens AG: "ERTEC 400 | Enhanced Real-Time Ethernet Controller | Handbuch",no. Version 1.2.2 pp. 1-98, XP002637652, Retrieved from the Internet: Url:http||cache.automation.siemens.com|dniiDUI DUxNDgzNwAA_21631481_HBIERTEC400_Handbuch_V122.pdf [retrieved on May 2, 2011].
Decision of Rejection for Chinese Application No. 2015103905202.2, dated Nov. 5, 2019.
European Search Report for European Application No. 14196406.4, dated Sep. 23, 2015.
European Search Report for EP Application No. 14196408.0, dated Nov. 24, 2015.
European Search Report dated Nov. 4, 2015 in Application No. EP14196406.4.
Examination Report for European Application No. 17178867.2, dated Mar. 13, 2019.
Examination Report for European Patent Application No. 16165112.0, dated Apr. 17, 2019.
Partial Search Report for European Applicaton No.15175744.0, dated Dec. 14, 2015.
Examination Report for European Patent Application No. 16154943.1, dated May 16, 2019.
Examination Report for European Patent Application No. 17208183.8, dated Oct. 29, 2019.
Extended European Search Report for European Patent Application No. EP14180106.8, dated 31 Aug. 12, 2015.
Extended European Search Report for European Patent Application No. EP 14196409 dated May 31, 2016, 10 pages.
Extended European Search Report for European Patent Application No. EP 16154943 dated Jun. 29, 2016, 9pages.
Extended European Search Report for European Patent Application No.EP 18176358 dated Sep. 11, 2018, 11 pages.
International Search Report and Written Opinion dated May 12, 2014 in International Application# PCT/US2013/053721.
Notice of Reason for Rejection for Japanese Patent Application No. 2014-243830, dated Jul. 10, 2019.
Notice of Reason for Rejection for JP Patent Application No. 2018-109151, dated Jun. 25, 2019.
Office Action for Canadian Application No. 2,875,515, dated Feb. 17, 2016.
Office Action for Chinese Application No. 2015103905202.2, dated Aug. 6, 2019.
Office Action for Chinese Patent Application 201410802889.5, dated May 7, 2019.
Office Action for Canadian Application No. 2,920,133, dated Apr. 14, 2016.
Office Action for Chinese Patent Application No. 20141079999.2, dated Jul. 3, 2019.
Office Action for Chinese Patent Application No. 201610236358.3, dated Sep. 4, 2019.
Office Action from Chinese Patent Application 201410802889.5, dated Dec. 4, 2019.
Office Action from Chinese Paten Application No. 201610229230.4, dated Oct. 24, 2019.
Office Action for Japanese Application No. 2015-136186, dated Oct. 10, 2019.
Partial Supplementary European Search Report in Application No. 12862174.5, dated Nov. 3, 2015.
Decision of Rejection for Patent Application No. 2014-243827, dated Nov. 28, 2019.
Notice of Reason for Rejection for Patent Application No. 2016-021763, dated Nov. 27, 2019.
European search report for European Patent Application No. EP14196406 dated Oct. 2, 2015, 6 pages.
Roman Kleinerman, Daniel Feldman (May 2011), Power over Ethernet (PoE): An Energy-Efficient Alternative (PDF), Marvell, retrieved Sep. 9, 2018 © http://www.marvell.com/switching/assets/Marveii-PoE-An-Energy-Efficient-Aiternative.pdf (Year: 2011).
Partial European Search Report for European Patent Application No. EP 15175744 dated Jan. 4, 2016, 7 pages.
Examination Report for European Application No. 16165112.0, dated Apr. 17, 2019.
Office Action from EP Application No. 14196406.4, dated Jul. 29, 2019.

* cited by examiner

IMAGE CAPTURE DEVICES FOR A SECURE INDUSTRIAL CONTROL SYSTEM

CROSS-REFERENCE TO RELATED APPLICATIONS

The present application is a continuation-in-part of U.S. patent application Ser. No. 14/942,304, filed Nov. 16, 2015, and titled "SECURE INDUSTRIAL CONTROL SYSTEM," which is a continuation of U.S. patent application Ser. No. 14/469,931 (issued as U.S. Pat. No. 9,191,203), filed Aug. 27, 2014, and titled "SECURE INDUSTRIAL CONTROL SYSTEM," which is a continuation of International Application No. PCT/US2013/053721, filed Aug. 6, 2013, and titled "SECURE INDUSTRIAL CONTROL SYSTEM." The present application is also a continuation-in-part of U.S. patent application Ser. No. 14/519,066, filed Oct. 20, 2014, and titled "OPERATOR ACTION AUTHENTICATION IN AN INDUSTRIAL CONTROL SYSTEM." The present application is also a continuation-in-part of U.S. patent application Ser. No. 15/287,937, filed Oct. 7, 2016, and titled "INDUSTRIAL CONTROL SYSTEM REDUNDANT COMMUNICATIONS/CONTROL MODULES AUTHENTICATION," which is a continuation of U.S. patent application Ser. No. 14/519,047 (issued as U.S. Pat. No. 9,467,297), filed Oct. 20, 2014, and titled "INDUSTRIAL CONTROL SYSTEM REDUNDANT COMMUNICATIONS/CONTROL MODULES AUTHENTICATION." The present application is also a continuation-in-part of U.S. patent application Ser. No. 14/597,498, filed Jan. 15, 2015, and titled "ELECTROMAGNETIC CONNECTOR," which is a continuation of U.S. patent application Ser. No. 13/341,143, filed Dec. 30, 2011, and titled "ELECTROMAGNETIC CONNECTOR." The present application is also a continuation-in-part of U.S. patent application Ser. No. 15/247,998, filed Aug. 26, 2016, and titled "SWITCH FABRIC HAVING A SERIAL COMMUNICATIONS INTERFACE AND A PARALLEL COMMUNICATIONS INTERFACE, which is a continuation of U.S. patent application Ser. No. 14/501,974 (issued as U.S. Pat. No. 9,436,641), filed Sep. 30, 2014, and titled "SWITCH FABRIC HAVING A SERIAL COMMUNICATIONS INTERFACE AND A PARALLEL COMMUNICATIONS INTERFACE," which is a continuation of U.S. patent application Ser. No. 13/341,161 (issued as U.S. Pat. No. 8,862,802), filed Dec. 30, 2011, and titled "SWITCH FABRIC HAVING A SERIAL COMMUNICATIONS INTERFACE AND A PARALLEL COMMUNICATIONS INTERFACE." The present application is also a continuation-in-part of U.S. patent application Ser. No. 15/289,613, filed Oct. 10, 2016, and titled "COMMUNICATIONS CONTROL SYSTEM WITH A SERIAL COMMUNICATIONS INTERFACE AND A PARALLEL COMMUNICATIONS INTERFACE, which is a continuation of U.S. patent application Ser. No. 14/502,006 (issued as U.S. Pat. No. 9,465,762), filed Sep. 30, 2014, and titled "COMMUNICATIONS CONTROL SYSTEM WITH A SERIAL COMMUNICATIONS INTERFACE AND A PARALLEL COMMUNICATIONS INTERFACE," which is a continuation of U.S. patent application Ser. No. 13/341,176 (U.S. Pat. No. 8,868,813), filed Dec. 30, 2011, and titled "COMMUNICATIONS CONTROL SYSTEM WITH A SERIAL COMMUNICATIONS INTERFACE AND A PARALLEL COMMUNICATIONS INTERFACE."

Each of the patents and patent applications cross-referenced above is incorporated herein by reference in its entirety.

BACKGROUND

Industrial control systems, such as standard industrial control systems (ICS) or programmable automation controllers (PAC), include various types of control equipment used in industrial production, such as supervisory control and data acquisition (SCADA) systems, distributed control systems (DCS), programmable logic controllers (PLC), and industrial safety systems certified to safety standards such as IEC61508. These systems are used in industries including electrical, water and wastewater, oil and gas production and refining, chemical, food, pharmaceuticals and robotics. Using information collected from various types of sensors to measure process variables, automated and/or operator-driven supervisory commands from the industrial control system can be transmitted to various actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In other examples, SCADA systems can use open-loop control with process sites that may be widely separated geographically. These systems use Remote Terminal Units (RTUs) to send supervisory data to one or more control centers. SCADA applications that deploy RTU's include fluid pipelines, electrical distribution and large communication systems. DCS systems are generally used for real-time data collection and continuous control with high-bandwidth, low-latency data networks and are used in large campus industrial process plants, such as oil and gas, refining, chemical, pharmaceutical, food and beverage, water and wastewater, pulp and paper, utility power, and mining and metals. PLCs more typically provide Boolean and sequential logic operations, and timers, as well as continuous control and are often used in stand-alone machinery and robotics. Further, ICE and PAC systems can be used in facility processes for buildings, airports, ships, space stations, and the like (e.g., to monitor and control Heating, Ventilation, and Air Conditioning (HVAC) equipment and energy consumption). As industrial control systems evolve, new technologies are combining aspects of these various types of control systems. For instance, PACs can include aspects of SCADA, DCS, and PLCs.

Industrial systems are evolving in a similar manner to the "internet of things" but with much higher security, reliability, and throughput requirements. Security at all levels is needed. This includes edge devices, which can be a way into the system for malicious actors if left unsecured.

SUMMARY

Implementations of image capture devices (e.g., cameras) for a secure industrial control system are disclosed herein. An image capture device can include an image sensor, a signal processor coupled to the image sensor, and a controller for managing the signal processor. The controller can also be configured to transmit data associated with processed image signals to one or more devices coupled to the image capture device. For example, the controller can transmit data associated with processed image signals (e.g., encoded image frames, metadata, etc.) to an input/output module and/or a communications/control module via a communications interface that couples the controller to the input/output module and/or communications/control module. In embodiments, the controller is configured to establish an encrypted tunnel between the controller and the input/output module and/or communications/control module based upon at least one respective security credential of the image capture device and at least one respective security credential of the input/output module and/or communications/control module. The controller can also be configured to perform an authentication sequence with the input/output module and/or communications/control module utilizing the at least one respective security credential of the image capture device and the at least one respective security credential of the input/output module and/or communications/control module, whereby the image capture device can be authenticated and given permissions to transmit and/or receive information from the input/output module and/or communications/control module, and/or other components of the secure industrial control system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Industrial systems are evolving in a similar manner to the "internet of things" with high security, reliability, and throughput requirements. Security at all levels is needed. This includes edge devices, which can be a way into the system for malicious actors if left unsecured. For example, surveillance cameras, though often thought of as "security devices," can be vulnerable access points into an industrial control system. In some instances, a counterfeit or hacked camera can be used to gain unauthorized entry to an industrial control system in order to gain access to video footage or other information, or even to introduce fictitious video footage (e.g., for purposes of tripping a false alarm, etc.). In some instances, a camera network connection can be used to worm malware into non-camera network databases, for example, as an entry point for malicious code to gain remote access, steal or tamper with control system information, and so forth.

Implementations of image capture devices (e.g., cameras) for a secure industrial control system are disclosed herein. In embodiments, an image capture device for a secure industrial control system can include an image sensor, a signal processor coupled to the image sensor, and a controller for managing the signal processor. The controller can also be configured to transmit data associated with processed image signals to one or more devices coupled to the image capture device. For example, the controller can transmit data associated with processed image signals (e.g., encoded image frames, metadata, etc.) to an input/output module and/or a communications/control module via a communications interface that couples the controller to the input/output module and/or communications/control module. In embodiments, the controller is configured to establish an encrypted tunnel between the controller and the input/output module and/or communications/control module based upon at least one respective security credential of the image capture device and at least one respective security credential of the input/output module and/or communications/control module. The controller can also be configured to perform an authentication sequence with the input/output module and/or communications/control module utilizing the respective security credential of the image capture device and the respective security credential of the input/output module and/or communications/control module, whereby the image capture device can be authenticated and given permissions to transmit and/or receive information from the input/output module and/or communications/control module, and/or other components of the secure industrial control system. For example, transmitted information can include, but is not limited to, captured images, video footage, spectral information (e.g., for fire, gas, and/or radiation detection), or combinations thereof.

Example Implementations

Figure 1:
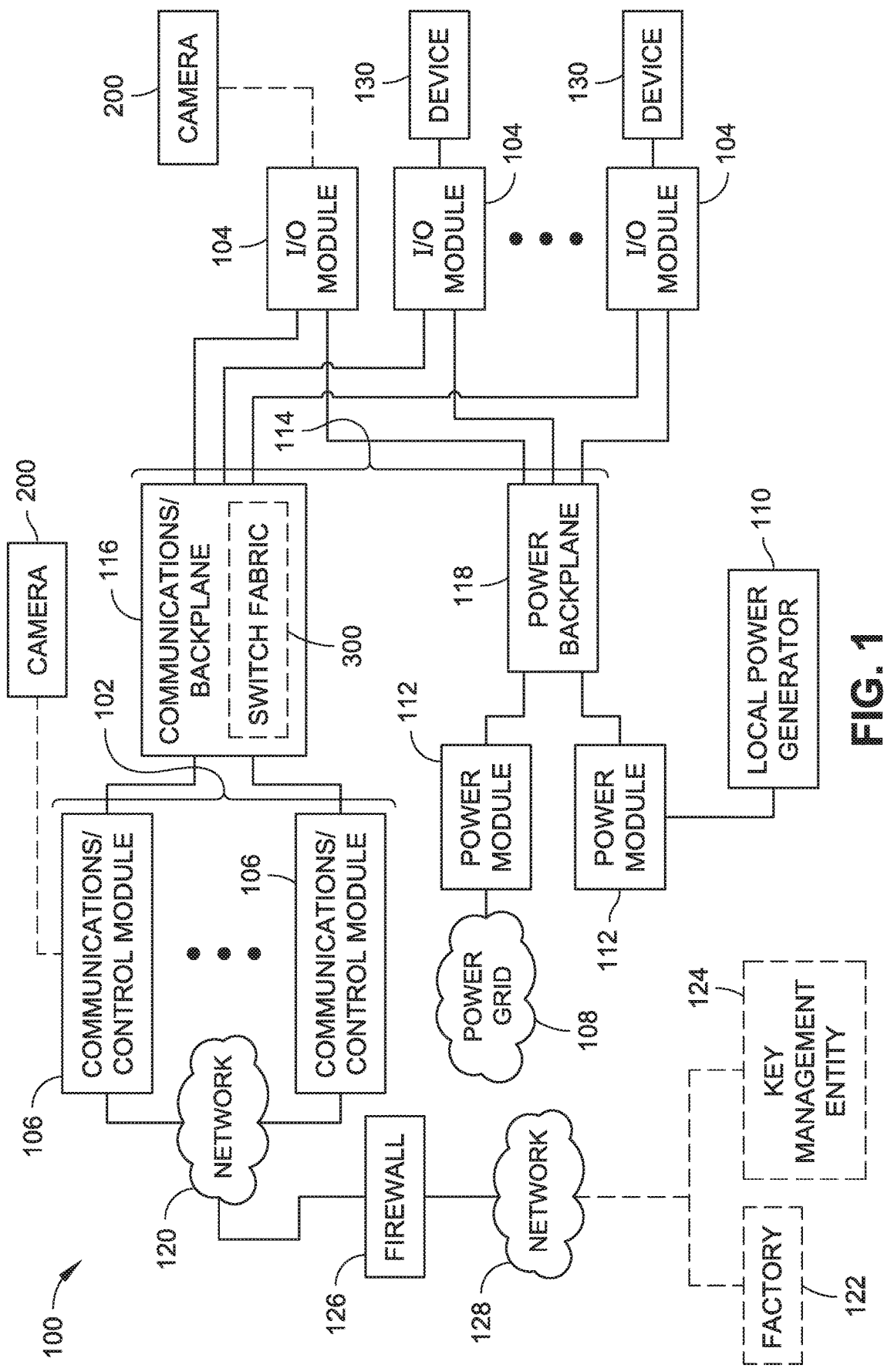
FIG. 1 is a block diagram illustrating a secure industrial control system, in accordance with an embodiment of this disclosure.

FIG. 1 illustrates an industrial control system 100 in accordance with an example embodiment of the present disclosure. In embodiments, the industrial control system 100 may comprise an industrial control system (ICS), a programmable automation controller (PAC), a supervisory control and data acquisition (SCADA) system, a distributed control system (DCS), programmable logic controller (PLC), and industrial safety system certified to safety standards such as IEC1508, or the like. As shown in FIG. 1, the industrial control system 100 uses a communications control architecture to implement a distributed control system that includes one or more industrial elements (e.g., input/output (I/O) modules, power modules, field devices, image capture devices (e.g., surveillance cameras, physical security cameras, specialized spectral detection cameras (e.g., for fire, gas, and/or radiation detection), etc.), switches, workstations, and/or physical interconnect devices) that are controlled or driven by one or more control elements or subsystems 102 distributed throughout the system. For example, one or more I/O modules 104 may be connected to one or more communications/control modules 106 (sometimes abbreviated as (CCMs)) making up the control element/subsystem 102.

The industrial control system 100 is configured to transmit data to and from the I/O modules 104. The I/O modules 104 can comprise input modules, output modules, and/or input and output modules. For instance, input modules can be used to receive information from input devices 130 (e.g., sensors) in the process, while output modules can be used to transmit instructions to output devices (e.g., actuators). For example, an I/O module 104 can be connected to a process sensor for measuring pressure in piping for a gas plant, a refinery, and so forth and/or connected to a process actuator for controlling a valve, binary or multiple state switch, transmitter, or the like. Field devices 130 are communicatively coupled with the IO modules 104 either directly or via network connections. These devices 130 can include control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

The I/O modules 104 can be used in the industrial control system 100 to collect data in applications including, but not necessarily limited to critical infrastructure and/or industrial processes, such as product manufacturing and fabrication, utility power generation, oil, gas, and chemical refining; pharmaceuticals, food and beverage, pulp and paper, metals and mining and facility and large campus industrial processes for buildings, airports, ships, and space stations (e.g., to monitor and control Heating, Ventilation, and Air Conditioning (HVAC) equipment and energy consumption).

In some implementations, the I/O modules 104 can also be used to connect image capture devices 200 (e.g., cameras, such as surveillance cameras, physical security cameras, specialized spectral detection cameras, and the like) to the industrial control system 100. In other implementations, image capture devices 200 can be connected via communications/control modules 106 or other inputs to a communications backplane 116 that facilitates interconnectivity of industrial control system elements, on-site and off-site (e.g., connectivity to network 120 for enterprise systems/applications, external control systems/applications, engineering interface control systems/applications, external monitoring systems/applications, operator/administrator monitoring or control systems/applications, and the like).

Figure 2:
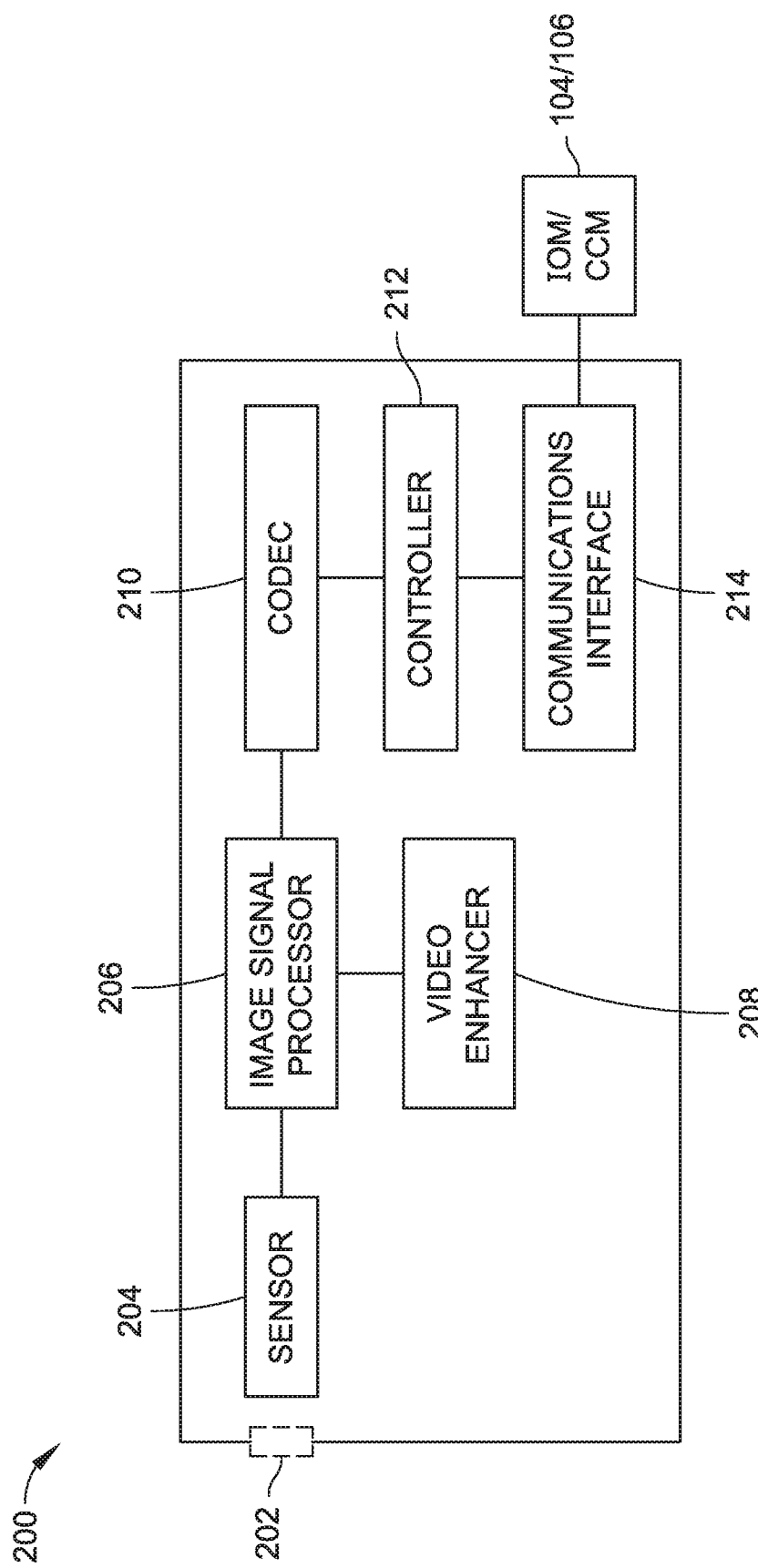
FIG. 2 is a block diagram illustrating an image capture device for a secure industrial control system, in accordance with an embodiment of this disclosure.

As shown in FIG. 2, an image capture device 200 includes an image sensor (e.g., a CMOS image sensor, CCD image sensor, or the like) having a signal processor 206 coupled to the image sensor 204. In embodiments, the image sensor 204 can have a lens or lens assembly 202 disposed over the image sensor 204 for focusing light onto the image sensor 204. The signal processor 206 can be configured to receive image signals from the image sensor 204 and apply one or more filters, adjust gain levels, convert the image signals from an analog format to a digital format, and so forth. The image capture device 200 can further include a codec 210 for encoding the processed image signals into a data format that can be decoded by end devices in the industrial control system 100. In some embodiments, an image capture device 200 includes a video enhancer for adjusting picture attributes (e.g., brightness, contrast, etc.), for example, by boosting gain of one or more signal components before, after, or during signal processing (i.e., at the signal processor 206). The image capture device 200 further includes a controller 212 (e.g., a microcontroller, microprocessor, ASIC, programmable logic device, or the like) for managing the signal processor 206 components, circuitry, and/or modules of the image capture device 200. The controller 212 can also be configured to transmit data associated with processed image signals to one or more devices coupled to the image capture device 200. For example, the controller 212 can transmit data associated with processed image signals (e.g., encoded image frames, metadata, etc.) to an input/output module 104 and/or a communications/control module 106 via a communications interface 214 (e.g., transmitter, receiver, and/or transceiver) that couples the controller 212 to the input/output module 104 and/or communications/control module 106. In some embodiments, the input/output module 104 and/or the communications/control module 106 is configured to pre-process or post-process image signals received from the image capture device 200 before transmitting the processed image signals to another industrial element of the secure industrial control system or a network connected device. For example, the input/output module 104 and/or the communications/control module 106 can be configured to perform an additional filtering, encoding, or encryption of the processed image signals. In some embodiments, the communications interface 214 includes a port configured to receive a wired connection for coupling the image capture device 200 to an external device (e.g., IOM 104, CCM 106, or other industrial control system element). In other embodiments, the communications interface 214 can include a wireless transmitter, receiver, and/or transceiver to facilitate wireless connectivity between the image capture device 200 and an external device.

The communications interface 214 may comprise a Power Over Ethernet (POE) port for receiving power supplied by the external device. For example, the image capture device 200 may be coupled to a secure Ethernet I/O module having POE capabilities. The I/O module 104 can include the BEDROCK SIO4.E Secure Ethernet Module or the like. In some embodiments, the I/O module 104 (e.g., BEDROCK SIO4.E Secure Ethernet Module) comprises a multi-channel secure software configurable Ethernet module that can have software configurable protocols on each port, support for Ethernet I/P, Modbus TCP and OPC UA client, other Protocols including Profinet and DNP3 planned, POE available on one or more port for Ethernet powered device, and/or 10/100 Mbps half/full duplex capability. In some implementations, the image capture device 200 is configured to transmit data associated with the processed images at a baud rate in the range of approximately 9600 and 10M baud, with a frame rate of 5 to 60 fps and 240 to 1080p resolution. For example, the image capture device 200 can be configured to transmit at 15 fps, 720p at 2 Mbaud or less. These ranges are provided by way of example and should not be considered restrictions of the present disclosure.

In embodiments, the image capture device controller 212 is configured to establish an encrypted tunnel between the controller 212 and the external device (e.g., input/output module 104 or communications/control module 106) based upon at least one respective security credential of the image capture device 200 and at least one respective security credential of the external device. The controller 212 can also be configured to perform an authentication sequence with the external device utilizing the respective security credential of the image capture device 200 and the respective security credential of the external device, whereby the image capture device 200 can be authenticated and given permissions to transmit and/or receive information from the input/output module 104 and/or communications/control module 106, and/or other components of the secure industrial control system 100.

As discussed in further detail below, the respective security credential of the image capture device 200 can comprise a unique security credential provisioned for the image capture device 200 by a key management entity 124. For example, the unique security credential can be provisioned at a respective point of manufacture (of the image capture device 200) from the key management entity 124. In some embodiments, the respective security credential is modifiable, revocable, and/or authenticatable by the key management entity 124 at a site different from the respective point of manufacture (e.g., when the image capture device 200 is installed in the industrial control system 100). Additionally or alternatively, the respective security credential may be modifiable, revocable, and/or authenticatable by the external device (e.g., the input/output module 104 or the communications/control module 106) or by another industrial control system element in communication with the image capture device 200.

In some embodiments, the image capture device 200 may include a specialty camera. For example, the one or more processed image signals include spectral data detected by the image sensor 204. The controller 212 can be configured to transmit the spectral data for monitoring one or more industrial control system environmental conditions. For example, the image capture device 200 may be configured to monitor one or more industrial control system environmental conditions, including, but not limited to, environmental presence of one or more of: fire, dust, smoke, microparticles, heat, moisture, elevated pressure, gas, radiation, or the like. In some embodiments, the image sensor 204 can comprise a thermal image sensor, night vision image sensor, UV light sensor, infrared light sensor, or the like. In implementations, spectral data detected by the image capture device 200 can trigger an alarm/alert (e.g., responsive to detecting a fire, gas leak, etc.).

Referring again to FIG. 1, I/O modules 104 can be configured to convert analog data received from sensors to digital data (e.g., using Analog-to-Digital Converter (ADC) circuitry, and so forth). An I/O module 104 can also be connected to one or more process actuators such as a motor or a regulating valve or an electrical relay and other forms of actuators and configured to control one or more operating characteristics of the motor, such as motor speed, motor torque, or position of the regulating valve or state of the electrical relay and so forth. Further, the I/O module 104 can be configured to convert digital data to analog data for transmission to the actuator (e.g., using Digital-to-Analog (DAC) circuitry, and so forth). In implementations, one or more of the I/O modules 104 can comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more I/O modules 104 can be used to provide fault tolerant and redundant connections for various field devices 130 such as control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

Each I/O module 104 can be provided with a unique identifier (ID) for distinguishing one I/O module 104 from another I/O module 104. In implementations, an I/O module 104 is identified by its ID when it is connected to the industrial control system 100. Multiple I/O modules 104 can be used with the industrial control 100 to provide redundancy. For example, two or more I/O modules 104 can be connected to a process sensor and/or actuator. Each I/O module 104 can include one or more ports that furnish a physical connection to hardware and circuitry included with the I/O module 104, such as a printed circuit board (PCB), and so forth. For example, each I/O module 104 includes a connection for a cable that connects the cable to a printed wiring board (PWB) in the I/O module 104.

One or more of the I/O modules 104 can include an interface for connecting to other networks including, but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 104 can include a connection for connecting an I/O module 104 to a computer bus, and so forth.

The communications/control modules 106 can be used to monitor and control the I/O modules 104, and to connect two or more I/O modules 104 together. In embodiments of the disclosure, a communications/control module 106 can update a routing table when an I/O module 104 is connected to the industrial control system 100 based upon a unique ID for the I/O module 104. Further, when multiple redundant I/O modules 104 are used, each communications/control module 106 can implement mirroring of informational databases regarding the I/O modules 104 and update them as data is received from and/or transmitted to the I/O modules 104. In some embodiments, two or more communications/control module 106 are used to provide redundancy. For added security, redundant communications/control modules 106 can be configured to perform an authentication sequence or handshake to authenticate one another at predefined events or times including such as startup, reset, installation of a new control module 106, replacement of a communications/control module 106, periodically, scheduled times, and the like.

In some implementations, data transmitted by the industrial control system 100 can be packetized, i.e., discrete portions of the data can be converted into data packets comprising the data portions along with network control information, and so forth. The industrial control system 100 can use one or more protocols for data transmission, including a bit-oriented synchronous data link layer protocol such as High-Level Data Link Control (HDLC). In some embodiments, the industrial control system 100 implements HDLC according to an International Organization for Standardization (ISO) 13239 standard, or the like. Further, two or more communications/control modules 106 can be used to implement redundant HDLC. However, it should be noted that HDLC is provided by way of example only and is not meant to be restrictive of the present disclosure. Thus, the industrial control system 100 can use other various communications protocols in accordance with the present disclosure.

One or more of the communications/control module 106 can be configured for exchanging information with components used for monitoring and/or controlling the field devices 130 (e.g., sensor and/or actuator instrumentation) connected to the industrial control system 100 via the I/O modules 104, such as one or more control loop feedback mechanisms/controllers. In implementations, a controller can be configured as a microcontroller/Programmable Logic Controller (PLC), a Proportional-Integral-Derivative (PID) controller, and so forth. In some embodiments, the I/O modules 104 and the communications/control modules 106 include network interfaces, e.g., for connecting one or more I/O modules 104 to one or more controllers via a network. In implementations, a network interface can be configured as a Gigabit Ethernet interface for connecting the I/O modules 104 to a Local Area Network (LAN). Further, two or more communications/control modules 106 can be used to implement redundant Gigabit Ethernet. However, it should be noted that Gigabit Ethernet is provided by way of example only and is not meant to be restrictive of the present disclosure. Thus, a network interface can be configured for connecting the communications/control modules 106 to other various networks including, but not necessarily limited to: a wide-area cellular telephone network, such as a 3G cellular network, a 4G cellular network, or a GSM network; a wireless computer communications network, such as a Wi-Fi network (e.g., a WLAN operated using IEEE 802.11 network standards); a PAN (e.g., a WPAN operated using IEEE 802.15 network standards); a WAN; an intranet; an extranet; an internet; the Internet; and so on. Additionally, a network interface can be implemented using a computer bus. For example, a network interface can include a Peripheral Component Interconnect (PCI) card interface, such as a Mini PCI interface, and so forth. Further, the network can be configured to include a single network or multiple networks across different access points.

The industrial control system 100 can receive electrical power from multiple sources. For example, AC power is supplied from a power grid 108 (e.g., using high voltage power from AC mains). AC power can also be supplied using local power generation (e.g., an on-site turbine or diesel local power generator 110). A power supply 112 is used to distribute electrical power from the power grid 108 to automation equipment of the industrial control system 100, such as controllers, I/O modules, and so forth. A power supply 112 can also be used to distribute electrical power from the local power generator 110 to the industrial control system equipment. The industrial control system 100 can also include additional (backup) power supplies configured to store and return DC power using multiple battery modules. For example, a power supply 112 functions as a UPS. In embodiments of the disclosure, multiple power supplies 112 can be distributed (e.g., physically decentralized) within the industrial control system 100.

In some embodiments, the control elements/subsystems and/or industrial elements (e.g., the I/O modules 104, the communications/control modules 106, the power supplies 112, and so forth) are connected together by one or more backplanes 114. For example, communications/control modules 106 can be connected to I/O modules 104 by a communications backplane 116. Further, power supplies 112 can be connected to I/O modules 104 and/or to communications/control modules 106 by a power backplane 118. In some embodiments, physical interconnect devices (e.g., switches, connectors, or cables such as, but not limited to, those described in U.S. Non-provisional application Ser. No. 14/446,412, which is incorporated herein by reference in its entirety) are used to connect to the I/O modules 104, the communications/control modules 106, the power supplies 112, and possibly other industrial control system equipment. For example, a cable can be used to connect a communications/control module 106 to a network 120, another cable can be used to connect a power supply 112 to a power grid 108, another cable can be used to connect a power supply 112 to a local power generator 110, and so forth.

The communications backplane 116 includes switch fabric 300 facilitating interconnectivity of industrial control system elements coupled via the communications backplane 116. For example, the communications backplane 116 can physically and communicatively couple the communications/control module 106 to the I/O module 104, and can further couple these industrial control system elements to the network 120 (e.g., providing access to enterprise devices, engineering control interfaces/applications, and so forth). The image capture device 200 (and other devices 130) can be coupled to the communications backplane 116 directly or via a communications/control module 106 or I/O module 104 in order to facilitate access to high speed secure communication through the switch fabric 300.

In embodiments, the switch fabric 300 comprises a serial communications interface 302 and a parallel communications interface 304 for furnishing communications between a number of communications/control modules 106, I/O modules 104, image capture devices 200, field devices 130, and/or other elements of the industrial control system 100. Various elements can be connected to the industrial control system 100 using one or more electromagnetic connectors. For instance, each I/O module 104 can include or can be coupled to one or more electromagnetic connectors or connector assemblies, with core members extending through coils. In some embodiments, the coils can be implemented as planar windings on a circuit board. When included in an I/O module 104, the circuit board can be "floated" against a partial spring load, allowing for some movement of the circuit board perpendicular to the plane of a core member, e.g., to compensate for tolerances across the circuit board. For example, a self-holding spring loading mechanism can be provided in the module to provide a constant downward pressure to facilitate mating of the electromagnetic connection, compensating for stacked tolerances of the module, PCB, and baseplate/support frame and ensuring a constant mating of both halves of an electromagnetic connector assembly.

In some embodiments, a "tongue and groove" configuration can be used that provides inherent fastening and support in three planes. For example, a printed circuit board included within an I/O module 104 can be configured to slide along and between two track segments in a direction perpendicular to the plane of a core member. Further, a core member can be mechanically isolated from (e.g., not touching) the circuit board. It should be noted that the implementation with planar primary and secondary windings is provided by way of example only and is not necessarily meant to be restrictive of the present disclosure. Thus, other implementations can use other coil configurations, such as wire wound coils, and so forth. For example, the primary coil may comprise a planar winding, and the secondary coil may comprise a wire wound coil. Further, the primary coil may comprise a wire wound coil, and the secondary coil may comprise a planar winding. In other implementations, primary and secondary coils may both comprise wire wound coils.

The switch fabric 300 may be configured for use with any systems technology, such as telecommunications network technology, computer network technology, process control systems technology, and so forth. For example, the switch fabric 300 may be used with a distributed control system comprised of controller elements and subsystems, where the subsystems are controlled by one or more controllers distributed throughout the system. The switch fabric 300 includes a serial communications interface 302 and a parallel communications interface 304 for furnishing communications with a number of slave devices.

The serial communications interface 302 may be implemented using a group of connectors connected in parallel with one another. In some embodiments, the connectors may be configured as electromagnetic connectors/connector assemblies (e.g., as previously described). For example, the serial communications interface 302 may be implemented using a multidrop bus 306, or the like. In implementations, the multidrop bus 306 may be used for configuration and diagnostic functions of the I/O modules 104/slave devices. The parallel communications interface 304 allows multiple signals to be transmitted simultaneously over multiple dedicated high speed parallel communication channels. For instance, the parallel communications interface 304 may be implemented using a cross switch 308, or the like.

Figure 3:
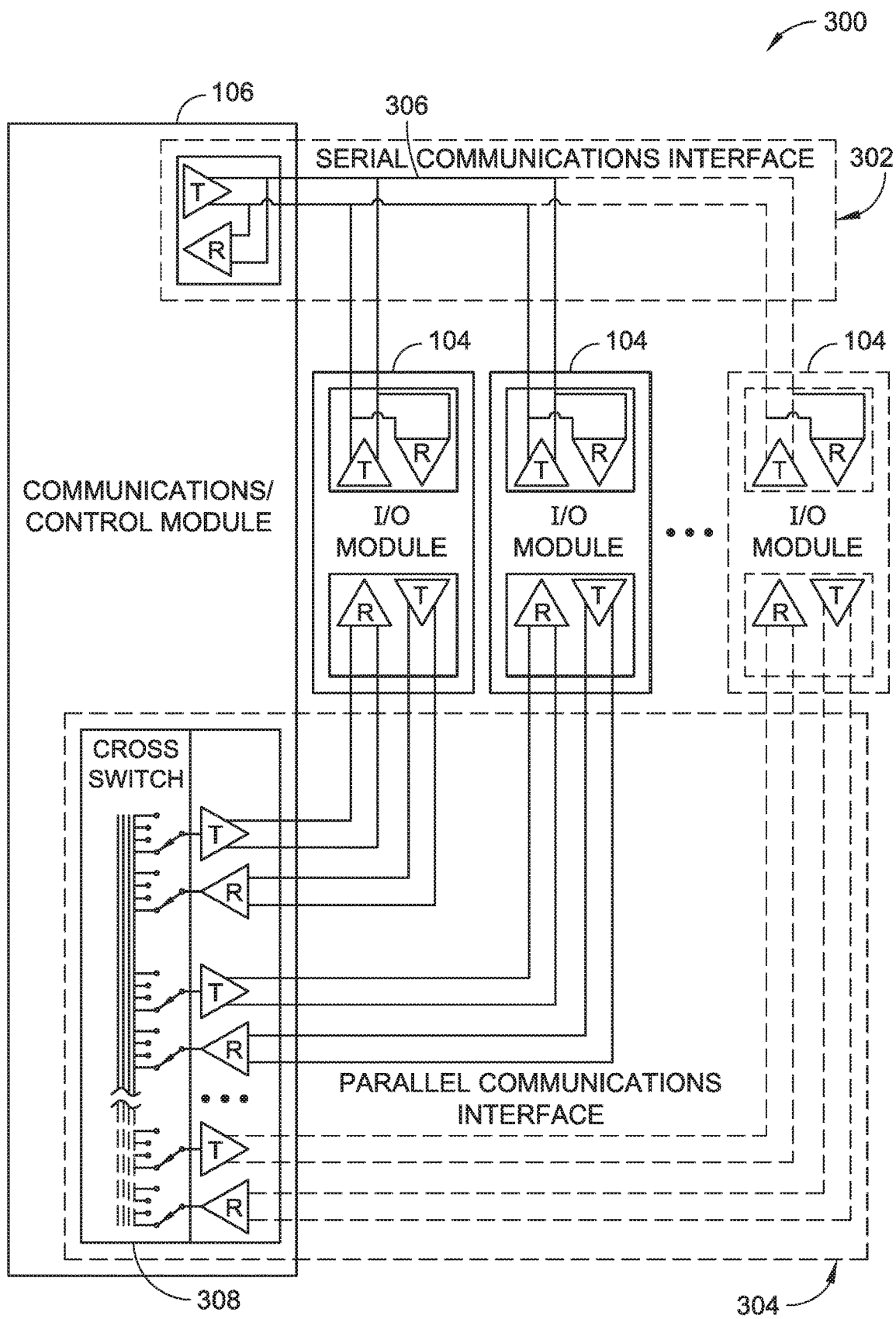
FIG. 3 is a block diagram illustrating a switch fabric for a communications backplane of a secure industrial control system, in accordance with an embodiment of this disclosure.

In an embodiment shown in FIG. 3, the parallel communications interface 304 may be implemented using a four (4) wire full duplex cross switch 308 with a dedicated connection to each I/O module 104/slave device. In implementations, each connection may be furnished using one or more electromagnetic connectors/connector assemblies (e.g., as previously described). The cross switch 308 can be implemented as a programmable cross switch connecting point-to-point busses and allowing traffic between the I/O modules 104/slave devices. The cross switch 308 may be configured by a master device, such as a communications/control module 106. For example, the communications/control module 106/master device may configure one or more sets of registers included in the cross switch 308 to control traffic between the I/O modules 104/slave devices. In implementations, a communications/control module 106/master device may comprise a rule set dictating how the I/O modules 104/slave devices are interconnected. For example, a communications/control module 106/master device may comprise a set of registers, where each register defines the operation of a particular switch (e.g., with respect to how packets are forwarded, and so forth). Thus, the cross switch 308 may not necessarily auto-configure, instead implementing a configuration provided by a communications/control module 106/the master device. However, this configuration is provided by way of example only and is not meant to be restrictive of the present disclosure. Thus, in other implementations, the cross switch 308 may auto-configure.

The parallel communications interface 304 may be used for data collection from the I/O modules 104/slave devices. Further, because each I/O module 104/slave device has its own private bus to the communications/control module 106/master device, each I/O module 104/slave device can communicate with the communications/control module 106 at the same time. Thus, the total response time for the industrial control system 100 (i.e., switch fabric 300) may be limited to that of the slowest I/O module 104/slave device, instead of the sum of all slave devices, as in the case of a typical multidrop bus.

In implementations, the switch fabric 300, the serial communications interface 302, and the parallel communications interface 304 may be implemented in a single, monolithic circuit board, e.g., with multiple E-shaped core members of electromagnetic connectors extending through the circuit board. In implementations, the core members may be mechanically isolated from the circuit board (e.g., not touching the circuit board). However, this configuration is provided by way of example only and is not meant to be restrictive of the present disclosure. Thus, the serial communications interface 302 and the parallel communications interface 304 may be implemented using different arrangements of multiple components, such as multiple discrete semiconductor devices for implementing the serial communications interface 302 and the parallel communications interface 304 separately, and so forth.

The switch fabric 300 may be configured for connecting one or more I/O modules 104 (e.g., as slave devices) and transmitting data to and from the I/O modules 104. The I/O modules 104 may comprise input modules, output modules, and/or input and output modules. For instance, input modules can be used to receive information from input instruments in the process or the field, while output modules can be used to transmit instructions to output instruments in the field. For example, an I/O module 104 can be connected to an image capture device 200 for detecting image signals, spectral data, etc., or to a process sensor, such as a sensor for measuring pressure in piping for a gas plant, a refinery, and so forth. In implementations, the I/O modules 104 can be used the industrial control system 100 collect data in applications including, but not necessarily limited to critical infrastructure and/or industrial processes, such as product manufacturing and fabrication, utility power generation, oil, gas, and chemical refining; pharmaceuticals, food and beverage, pulp and paper, metals and mining and facility and large campus industrial processes for buildings, airports, ships, and space stations (e.g., to monitor and control Heating, Ventilation, and Air Conditioning (HVAC) equipment and energy consumption).

Data transmitted using the switch fabric 300 may be packetized, i.e., discrete portions of the data may be converted into data packets comprising the data portions along with network control information, and so forth. The industrial control system 100/switch fabric 300 may use one or more protocols for data transmission, including a bit-oriented synchronous data link layer protocol such as High-Level Data Link Control (HDLC). In a specific instance, the industrial control system 100/switch fabric 300 may implement HDLC according to an International Organization for Standardization (ISO) 13239 standard, or the like. Further, two or more communications/control modules 106 can be used to implement redundant HDLC. However, it should be noted that HDLC is provided by way of example only and is not meant to be restrictive of the present disclosure. Thus, the industrial control system 100 may use other various communications protocols in accordance with the present disclosure.

The industrial control system 100 implements a secure control system, as described in U.S. patent application Ser. No. 14/469,931 (issued as U.S. Pat. No. 9,191,203) and International Application No. PCT/US2013/053721, which are entirely incorporated herein by reference. For example, the industrial control system 100 includes a security credential source (e.g., a factory 122) and a security credential implementer (e.g., a key management entity 124). In embodiment, a device lifetime management system can comprise the security credential implementer and the key management entity. The security credential source is configured to generate unique security credentials (e.g., keys, certificates, etc., such as a unique identifier, and/or a security credential). The security credential implementer is configured to provision the control elements/subsystems and/or industrial elements (e.g., cables, devices 130, I/O modules 104, communications/control modules 106, power supplies 112, and so forth) with a unique security credential generated by the security credential source.

Multiple (e.g., every) device 130, I/O module 104, communications/control module 106, power supply 112, physical interconnect devices, etc., of the industrial control system 100 can be provisioned with security credentials for providing security at multiple (e.g., all) levels of the industrial control system 100. Still further, the control elements/subsystems and/or industrial elements including the sensors and/or actuators and so forth, can be provisioned with the unique security credentials (e.g., keys, certificates, etc.) during manufacture (e.g., at birth), and can be managed from birth by a key management entity 124 of the industrial control system 100 for promoting security of the industrial control system 100. For example, the key management entity 124 can provision unique security credentials for components (e.g., for image capture devices 200 and other industrial control system elements) at respective manufacturing sites, and the key management entity 124 can be further configured to authenticate, revoke, or modify the security credentials when the components are implemented at a site different from each component's respective manufacturing site (e.g., when the component is installed/used in the industrial control system 100)

In some embodiments, communications between the control elements/subsystems and/or industrial elements including the sensors and/or actuators and so forth, of the industrial control system 100 includes an authentication process. The authentication process can be performed for authenticating control elements/subsystem and/or industrial elements including the sensors and/or actuators and so forth, implemented in the industrial control system 100. Further, the authentication process can utilize security credentials associated with the element and/or physical interconnect device for authenticating that element and/or physical interconnect device. For example, the security credentials can include encryption keys, certificates (e.g., public key certificates, digital certificates, identity certificates, security certificates, asymmetric certificates, standard certificates, non-standard certificates) and/or identification numbers.

In implementations, multiple control elements/subsystems and/or industrial elements of the industrial control system 100 are provisioned with their own unique security credentials. For example, each element of the industrial control system 100 may be provisioned with its own unique set(s) of certificates, encryption keys and/or identification numbers when the element is manufactured (e.g., the individual sets of keys and certificates are defined at the birth of the element). The sets of certificates, encryption keys and/or identification numbers are configured for providing/supporting strong encryption. The encryption keys can be implemented with standard (e.g., commercial off-the-shelf (COTS)) encryption algorithms, such as National Security Agency (NSA) algorithms, National Institute of Standards and Technology (NIST) algorithms, or the like.

Based upon the results of the authentication process, the element being authenticated can be activated, partial functionality of the element can be enabled or disabled within the industrial control system 100, complete functionality of the element can be enabled within the industrial control system 100, and/or functionality of the element within the industrial control system 100 can be completely disabled (e.g., no communication facilitated between that element and other elements of the industrial control system 100). In this regard, each element (e.g., a communications/control module 102, an I/O module 104, or the like) may be configured to authenticate, revoke, or modify a security credential of another industrial control system element (e.g., device 130, an image capture device 200, etc.) based upon success or failure of the authentication sequence utilizing respective security credentials of the industrial control system elements.

In embodiments, the industrial control system elements can establish secure communication paths or "tunnels" for securely transmitting information based upon the respective security credentials of the elements. For example, communications can be signed or encrypted by a first (transmitting) element and authenticated (e.g., verified or decrypted) by a second (receiving) element based upon the respective security credentials. In embodiments, an image capture device 200 can be configured to communicate data associated with processed image signals (e.g., image frames, spectral data, metadata, etc.) to a communications/control module 106 or an I/O module 104 (or other component of the industrial control system 100) via a secure tunnel. In some embodiments, the image capture device 200 only communicates information to a communications/control module 106 or an I/O module 104 (or other component of the industrial control system 100) after successfully authenticating or being authenticated by the receiving device.

In embodiments, the keys, certificates and/or identification numbers associated with an element of the industrial control system 100 can specify the original equipment manufacturer (OEM) of that element. As used herein, the term "original equipment manufacturer" or "OEM" can be defined as an entity that physically manufactures the device (e.g., element) and/or a supplier of the device such as an entity that purchases the device from a physical manufacturer and sells the device. Thus, in embodiments, a device can be manufactured and distributed (sold) by an OEM that is both the physical manufacturer and the supplier of the device. However, in other embodiments, a device can be distributed by an OEM that is a supplier, but is not the physical manufacturer. In such embodiments, the OEM can cause the device to be manufactured by a physical manufacturer (e.g., the OEM can purchase, contract, order, etc. the device from the physical manufacturer).

Additionally, where the OEM comprises a supplier that is not the physical manufacturer of the device, the device can bear the brand of the supplier instead of brand of the physical manufacturer. For example, in embodiments where an element (e.g., a communications/control module 106) is associated with a particular OEM that is a supplier but not the physical manufacturer, the element's keys, certificates and/or identification numbers can specify that origin. During authentication of an element of the industrial control system 100, when a determination is made that an element being authenticated was manufactured or supplied by an entity that is different than the OEM of one or more other elements of the industrial control system 100, then the functionality of that element can be at least partially disabled within the industrial control system 100. For example, limitations can be placed upon communication (e.g., data transfer) between that element and other elements of the industrial control system 100, such that the element cannot work/function within the industrial control system 100. When one of the elements of the industrial control system 100 requires replacement, this feature can prevent a user of the industrial control system 100 from unknowingly replacing the element with a non-homogenous element (e.g., an element having a different origin (a different OEM) than the remaining elements of the industrial control system 100) and implementing the element in the industrial control system 100. In this manner, the techniques described herein can prevent the substitution of elements of other OEM's into a secure industrial control system 100. In one example, the substitution of elements that furnish similar functionality in place of elements provided by an originating OEM can be prevented, since the substituted elements cannot authenticate and operate within the originating OEM's system. In another example, a first reseller can be provided with elements having a first set of physical and cryptographic labels by an originating OEM, and the first reseller's elements can be installed in an industrial control system 100. In this example, a second reseller can be provided with elements having a second (e.g., different) set of physical and cryptographic labels by the same originating OEM. In this example, the second reseller's elements may be prevented from operating within the industrial control system 100, since they may not authenticate and operate with the first reseller's elements. However, it should also be noted that the first reseller and the second reseller may enter into a mutual agreement, where the first and second elements can be configured to authenticate and operate within the same industrial control system 100. Further, in some embodiments, an agreement between resellers to allow interoperation can also be implemented so the agreement only applies to a specific customer, group of customers, facility, etc.

In another instance, a user can attempt to implement an incorrectly designated (e.g., mismarked) element within the industrial control system 100. For example, the mismarked element can have a physical indicia marked upon it which falsely indicates that the element is associated with the same OEM as the OEM of the other elements of the industrial control system 100. In such instances, the authentication process implemented by the industrial control system 100 can cause the user to be alerted that the element is counterfeit. This process can also promote improved security for the industrial control system 100, since counterfeit elements are often a vehicle by which malicious software can be introduced into the industrial control system 100. In embodiments, the authentication process provides a secure air gap for the industrial control system 100, ensuring that the secure industrial control system is physically isolated from insecure networks.

In implementations, the secure industrial control system 100 includes a key management entity 124. The key management entity 124 can be configured for managing cryptographic keys (e.g., encryption keys) in a cryptosystem. This managing of cryptographic keys (e.g., key management) can include the generation, exchange, storage, use, and/or replacement of the keys. For example, the key management entity 124 is configured to serve as a security credentials source, generating unique security credentials (e.g., public security credentials, secret security credentials) for the elements of the industrial control system 100. Key management pertains to keys at the user and/or system level (e.g., either between users or systems).

In embodiments, the key management entity 124 comprises a secure entity such as an entity located in a secure facility. The key management entity 124 can be remotely located from the I/O modules 104, the communications/control modules 106, and the network 120. For example, a firewall 126 can separate the key management entity 124 from the control elements or subsystems 102 and the network 120 (e.g., a corporate network). In implementations, the firewall 126 can be a software and/or hardware-based network security system that controls ingoing and outgoing network traffic by analyzing data packets and determining whether the data packets should be allowed through or not, based on a rule set. The firewall 126 thus establishes a barrier between a trusted, secure internal network (e.g., the network 120) and another network 128 that is not assumed to be secure and trusted (e.g., a cloud and/or the Internet). In embodiments, the firewall 126 allows for selective (e.g., secure) communication between the key management entity 124 and one or more of the control elements or subsystems 102 and/or the network 120. In examples, one or more firewalls can be implemented at various locations within the industrial control system 100. For example, firewalls can be integrated into switches and/or workstations of the network 120.

The secure industrial control system 100 can further include one or more manufacturing entities (e.g., factories 122). The manufacturing entities can be associated with original equipment manufacturers (OEMs) for the elements of the industrial control system 100. The key management entity 124 can be communicatively coupled with the manufacturing entity via a network (e.g., a cloud). In implementations, when the elements of the industrial control system 100 are being manufactured at one or more manufacturing entities, the key management entity 124 can be communicatively coupled with (e.g., can have an encrypted communications pipeline or tunnel to) the elements. The key management entity 124 can utilize the communications pipeline for provisioning the elements with security credentials (e.g., inserting keys, certificates and/or identification numbers into the elements) at the point of manufacture.

Further, when the elements are placed into use (e.g., activated), the key management entity 124 can be communicatively coupled (e.g., via an encrypted communications pipeline) to each individual element worldwide and can confirm and sign the use of specific code, revoke (e.g., remove) the use of any particular code, and/or enable the use of any particular code. Thus, the key management entity 124 can communicate with each element at the factory where the element is originally manufactured (e.g., born), such that the element is born with managed keys. A master database and/or table including all encryption keys, certificates and/or identification numbers for each element of the industrial control system 100 can be maintained by the key management entity 124. The key management entity 124, through its communication with the elements, is configured for revoking keys, thereby promoting the ability of the authentication mechanism to counter theft and re-use of components.

In implementations, the key management entity 124 can be communicatively coupled with one or more of the control elements/subsystems, industrial elements, and/or the network 120 via another network (e.g., a cloud and/or the Internet) and firewall. For example, in embodiments, the key management entity 124 can be a centralized system or a distributed system. Moreover, in embodiments, the key management entity 124 can be managed locally or remotely. In some implementations, the key management entity 124 can be located within (e.g., integrated into) the network 120 and/or the control elements or subsystems 102. The key management entity 124 can provide management and/or can be managed in a variety of ways. For example, the key management entity 124 can be implemented/managed: by a customer at a central location, by the customer at individual factory locations, by an external third party management company and/or by the customer at different layers of the industrial control system 100, and at different locations, depending on the layer.

Varying levels of security (e.g., scalable, user-configured amounts of security) can be provided by the authentication process. For example, a base level of security can be provided which authenticates the elements and protects code within the elements. Other layers of security can be added as well. For example, security can be implemented to such a degree that a component, such as the communications/control module 106, cannot power up without proper authentication occurring. In implementations, encryption in the code is implemented in the elements, while security credentials (e.g., keys and certificates) are implemented on the elements. Security can be distributed (e.g., flows) through the industrial control system 100. For example, security can flow through the industrial control system 100 all the way to an end user, who knows what a module is designed to control in that instance. In embodiments, the authentication process provides encryption, identification of devices for secure communication and authentication of system hardware or software components (e.g., via digital signature).

In implementations, the authentication process can be implemented to provide for and/or enable interoperability within the secure industrial control system 100 of elements manufactured and/or supplied by different manufacturers/ vendors/suppliers (e.g., OEMs). For example, selective (e.g., some) interoperability between elements manufactured and/or supplied by different manufacturers/vendors/ suppliers can be enabled. In embodiments, unique security credentials (e.g., keys) implemented during authentication can form a hierarchy, thereby allowing for different functions to be performed by different elements of the industrial control system 100.

The communication links connecting the components of the industrial control system 100 can further employ data packets, such as runt packets (e.g., packets smaller than sixty-four (64) bytes), placed (e.g., injected and/or stuffed) therein, providing an added level of security. The use of runt packets increases the level of difficulty with which outside information (e.g., malicious content such as false messages, malware (viruses), data mining applications, etc.) can be injected onto the communications links. For example, runt packets can be injected onto a communication link within gaps between data packets transmitted between the action originator 204 and the communications/control module 106 or any other industrial element/controller 206 to hinder an external entity's ability to inject malicious content onto the communication link.

Figure 4:
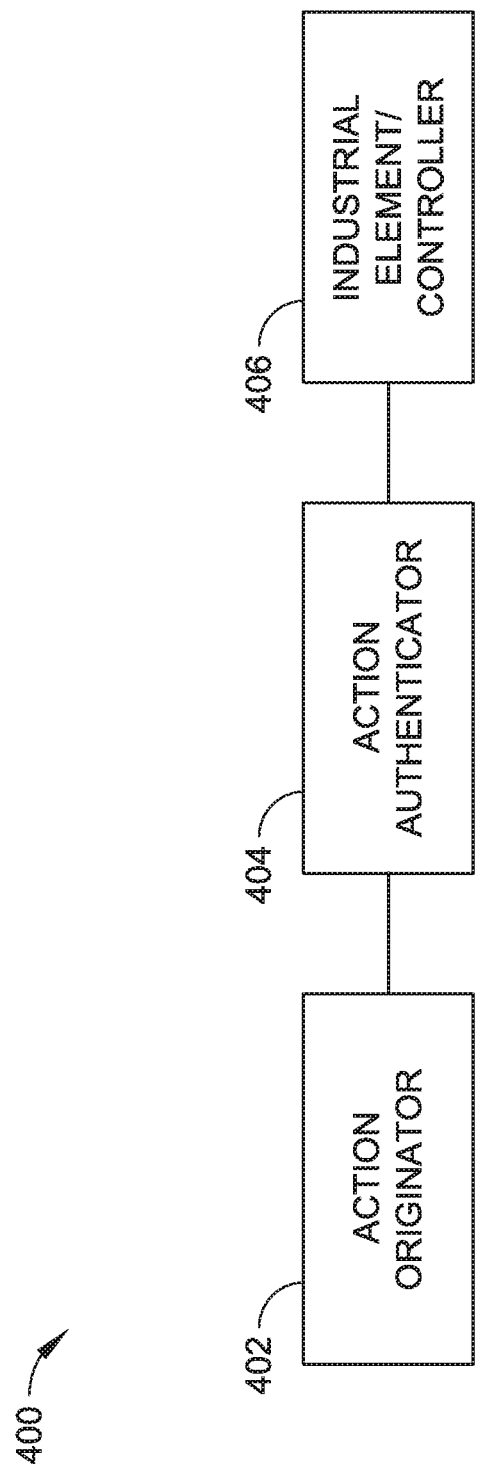
FIG. 4 is a block diagram illustrating an action authentication path for a secure industrial control system, in accordance with an embodiment of this disclosure.
Figure 5:
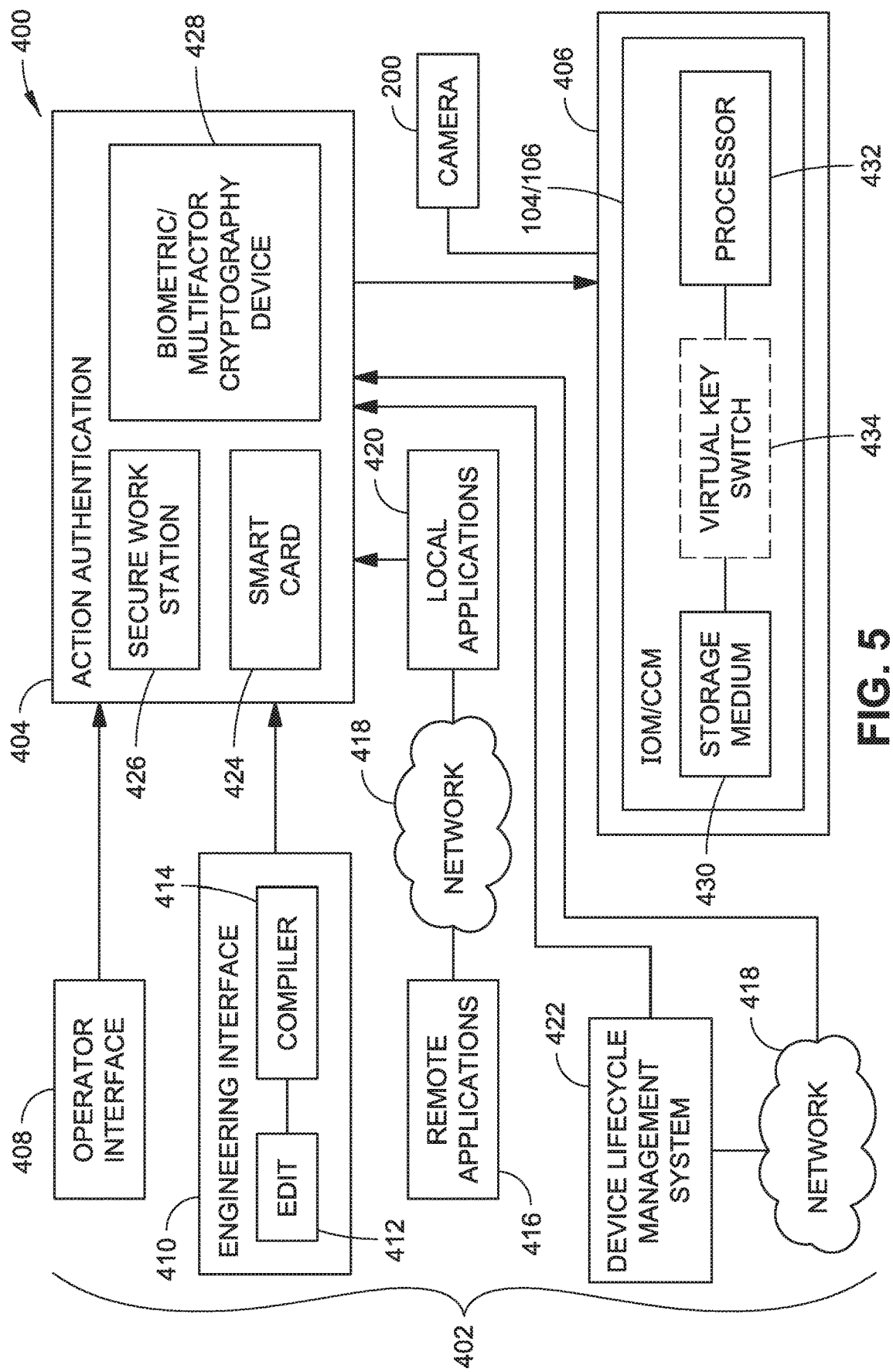
FIG. 5 is a block diagram further illustrating the action authentication path shown in FIG. 4, in accordance with an embodiment of this disclosure.

As shown in FIGS. 4 and 5, the I/O module 104, communications/control module 106, or any other industrial element/controller 406 can be at least partially operated according to requests/commands from an action originator 402. For example, the action originator 402 can access data from and/or send instructions/requests associated with setting or adjusting one or more system variables for the image capture device 200 or a field device 130 coupled to the IOM 104 or CCM 106. In implementations, the action originator 402 includes an operator interface 408 (e.g., SCADA or HMI), an engineering interface 410 including an editor 412 and a compiler 414, a local application 420, a remote application 416 (e.g., communicating through a network 418 via a local application 420), or the like. In the authentication path 400 illustrated in FIGS. 4 and 5, the industrial element/ controller 406 (e.g., IOM 104 or CCM 106) processes an operator action (e.g., request for data, instruction to change/ adjust one or more system variables, engineering interface command, control command, firmware/software update, set point control, application image download, or the like) only when the operator action has been signed and/or encrypted by an action authenticator 404 or a communication (e.g., authentication message) associated with the operator action is signed and/or encrypted. This prevents unauthorized operator actions from valid user profiles and further secures the system from unauthorized action requests coming from invalid (e.g., hacked) profiles. In embodiments, an action authentication process is implemented as described in U.S. patent application Ser. No. 14/519,066, which is incorporated herein by reference in its entirety.

The action authenticator 404 may include a storage medium with a private key stored thereon and a processor configured to sign and/or encrypt the action request generated by the action originator 402 with the private key. The private key can be stored in a memory that cannot be accessed via standard operator login. For instance, the secured workstation 426 can require a physical key, portable encryption device (e.g., smart card, RFID tag, or the like), and/or biometric input for access. In embodiments, the private key (e.g., security credential) can be provisioned by an onsite or offsite key management entity (e.g., onsite device lifecycle management system ("DLM") 422) or a remotely located DLM 422 connected via the network 418).

In some embodiments, the action authenticator 404 includes a portable encryption device such as a smart card 424 (which can include a secured microprocessor). The advantage of using a portable encryption device is that the entire device (including the privately stored key and processor in communication therewith) can be carried with an operator or user that has authorized access to an interface of the action originator 402. Whether the action authentication node 404 accesses the authentication path 400 via secured or unsecured workstation, the action request from the action originator 402 can be securely signed and/or encrypted within the architecture of the portable encryption device instead of a potentially less secure workstation or cloud-based architecture. This secures the industrial control system 100 from unauthorized actions. For instance, an unauthorized person would have to physically take possession of the smart card 424 before being able to authenticate any action requests sent via the action originator 402.

Furthermore, multiple layers of security can be employed. For example, the action authenticator 404 can include a secured workstation 426 that is only accessible to sign and/or encrypt action requests via smart card access or the like. Additionally, the secured workstation 426 can be accessible via a biometric or multifactor cryptography device 428 (e.g., fingerprint scanner, iris scanner, and/or facial recognition device). In some embodiments, a multifactor cryptography device 428 requires a valid biometric input before enabling the smart card 424 or other portable encryption device to sign the action request.

The industrial element/controller 406 being driven by the action originator 402 is configured to receive the signed action request, verify the authenticity of the signed action request, and perform a requested action when the authenticity of the signed action request is verified. In some embodiments, the industrial element/controller 406 includes a storage medium 430 (e.g., SD/micro-SD card, HDD, SSD, or any other non-transitory storage device) configured to store the action request (e.g., application image, control command, and/or any other data sent by the action originator). The industrial element/controller 406 further includes a processor 432 (e.g., microcontroller, microprocessor, ASIC, or the like) that performs/executes code associated with the operator action (i.e., performs a requested action) after authenticating the operator action or communication associated therewith. In some embodiments, the operator action is encrypted by the action originator 402 and/or the action authenticator 432 and must also be decrypted by the processor 432 before the requested action can be performed. In implementations, the industrial element/controller 406 includes a virtual key switch 434 (e.g., a software module running on the processor 432) that enables the processor 432 to execute the operator action only after authenticating the operator action or communication associated therewith. For example, the virtual key switch 434 can be configured to selectively enable/disable one or more operating modes of the processor 432 (e.g., safe mode, standard operational mode, secure operating mode, etc.). In some embodiments, each and every action or each one of a selection of critical actions must clear the authentication path before being run on by the industrial element/controller 406. For example, the can include any change of parameters/process variables or data requests sent for the image capture device 200 or a field device 130.

As discussed above, for further security, the image capture device 200 can be configured to perform an authentication sequence or handshake to authenticate with an external device (e.g., IOM 104 or CCM 106) that the image capture device 200 is connected to. The authentication can occur at predefined events or times including such as startup, reset, installation of an image capture device 200, replacement of an image capture device 200, periodically, at scheduled times, and so forth. By causing the image capture device 200 to authenticate with external devices to which the image capture device 200 is coupled, counterfeit or maliciously introduced image capture devices 200 can be avoided. In implementations, the external device can at least partially disable a feature of the image capture device 200 or prevent communications with the image capture device 200 when the authentication is unsuccessful.

Figure 6:
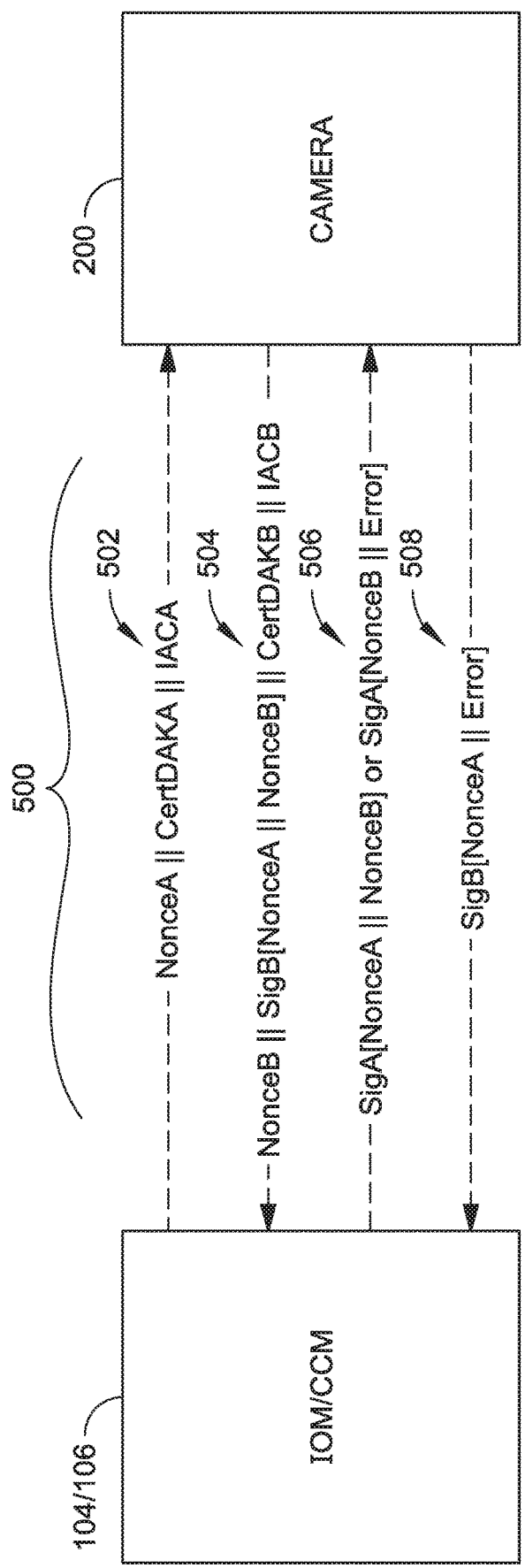
FIG. 6 is a block diagram illustrating an authentication sequence between an image capture device and an input/output module (IOM) or communications/control module (CCM) of a secure industrial control system, in accordance with an embodiment of this disclosure.

FIG. 6 shows example datagrams 500 transmitted between an image capture device 200 and an external device (e.g., IOM 104 or CCM 106) in performance of the authentication sequence. To initiate the authentication sequence, the external device is configured to transmit a request datagram 502 to the image capture device 200. In implementations, the request datagram 502 includes a first plain text nonce (NonceA), a first device authentication key certificate (CertDAKA) containing a first device authentication key (DAKA), and a first identity attribute certificate (IACA). In some embodiments, the external device is configured to generate the first nonce (NonceA) with a true random number generator (hereinafter "TRNG") and concatenate or otherwise combine the first nonce (NonceA), the first device authentication key certificate (CertDAKA), and the first identity attribute certificate (IACA) to generate the request datagram 502. In some embodiments, the first device authentication key certificate (CertDAKA) and the first identity attribute certificate (IACA) are locally stored by the external device. For example, the certificates may be stored in a local memory (e.g., ROM, RAM, flash memory, or other non-transitory storage medium) of an I/O module 104 or communications/control module 106.

The image capture device 200 is configured to validate the request datagram by verifying the first device authentication key certificate (CertDAKA) and the first identity attribute certificate (IACA) with public keys that are generated by a device lifecycle management system (DLM) or derived utilizing crypto library functions. In this regard, the public keys may be stored in SRAM or another local memory of the image capture device 200 and used with crypto library functions to verify or cryptographically sign exchanged data, such as the nonces exchanged between the external device and the image capture device 200. In some embodiments, the image capture device 200 may verify the certificates with an elliptic curve digital signing algorithm (hereinafter "ECDSA") or other verification operation. In some embodiments, the image capture device 200 may be further configured to validate the certificate values from plain text values by verifying the following: certificate type is device authentication key (hereinafter "DAK") or identity attribute certificate (hereinafter "IAC") for each certificate; IAC names match, DAK certificate module type matches module type argument; and/or microprocessor serial number (hereinafter "MPSN") of each certificate in the message payload match each other. In some embodiments, the image capture device 200 may be further configured to verify the DAK and IAC certificates are not in a local revocation list (e.g., a list or database including revoked and/or invalid certificates). When the image capture device 200 fails to validate the request datagram, the image capture device 200 may generate an error message, partially or completely disable the external device, and/or discontinue or restrict communications to/from the external device.

Responsive to a valid request datagram 502, the image capture device 200 is configured to transmit a response datagram 504 to the external device. In implementations, the response datagram 504 includes a second plain text nonce (NonceB), a first signature associated with the first and second nonces (SigB[NonceA||NonceB]), a second device authentication key certificate (certDAKB) containing a second device authentication key (DAKB), and a second identity attribute certificate (IACB). In some embodiments, the image capture device 200 is configured to generate the second nonce (NonceB) with a TRNG, concatenate or otherwise combine the first nonce (NonceA) and the second nonce (NonceB), and sign the concatenated/combined nonces with a private key (e.g., DAK) that is locally stored by the image capture device 200. The image capture device 200 is further configured to concatenate or otherwise combine the second nonce (NonceB), the first signature associated with the first and second nonces (SigB[NonceA||NonceB]), the second device authentication key certificate (certDAKB), and the second identity attribute certificate (IACB) to generate the response datagram 504. In some embodiments, the second device authentication key certificate (CertDAKB) and the second identity attribute certificate (IACB) are locally stored by the image capture device 200. For example, the certificates may be stored in a local memory (e.g., ROM, RAM, flash memory, or other non-transitory storage medium) of the image capture device 200.

The external device is configured to validate the response datagram by verifying the second device authentication key certificate (CertDAKB) and the second identity attribute certificate (IACB) with public keys that are locally stored or retrieved from a crypto library utilizing ECDSA or another verification operation. In some embodiments, the external device may be further configured to validate the certificate values from plain text values by verifying the following: IAC & DAK certificates have matching MPSNs, IAC names match, certificate types are correct on both certificates (IAC & DAK), the correct issuer name is on both certificates, DAK module type is the correct type (e.g., check to see if module type=communications/control module). In some embodiments, the external device may be further configured to verify the DAK and IAC certificates are not in a local revocation list.

To validate the response datagram, the external device may be further configured to verify the first signature associated with the first and second nonces (sigB[NonceA||NonceB]). In some embodiments, the external device is configured to verify the first signature (sigB[NonceA||NonceB]) by concatenating the first locally stored nonce (NonceA) and the second plaintext nonce (NonceB) received from the image capture device 200, verifying the first cryptographic signature (sigB[NonceA||NonceB]) with a public device authentication key (e.g., using DAKB from certDAKB), and comparing the locally generated concatenation of the first nonce and the second nonce with the cryptographically verified concatenation of the first nonce and the second nonce. When the external device fails to validate the response datagram, the external device may generate an error message, partially or completely disable the image capture device 200, and/or discontinue or restrict communications to/from the image capture device 200.

The external device is further configured to transmit an authentication datagram 506 to the image capture device 200 when the response datagram 504 is valid. In implementations, the authentication datagram 506 includes a second signature associated with the first and second nonces (sigA[NonceA||NonceB]). In some embodiments, the external device is configured to sign the locally generated concatenation of the first and second nonces a private key (e.g., DAK) that is locally stored by the external device. When the response datagram is invalid, the authentication datagram 506 may be replaced with a "failed" authentication datagram 506 including a signature associated with the second nonce and an error reporting (e.g., "failure") message (sigA[NonceB||Error]) generated by the external device.

Responsive to the authentication datagram 506, the image capture device 200 may be further configured to transmit a responsive authentication datagram 508 to the external device. In implementations, the responsive authentication datagram 508 includes a signature associated with the first nonce and an error reporting (e.g., "success" or "failure") message (sigB[NonceA||Error]) generated by the image capture device 200. In some embodiments, the image capture device 200 is configured to validate the authentication datagram 506 by verifying the second signature associated with the first and second nonces (sigA[NonceA||NonceB]). In some embodiments, the image capture device 200 is configured to verify the second signature (sigA[NonceA||NonceB]) by concatenating the first plaintext nonce (NonceA) received from the external device and the second locally stored nonce (NonceB), verifying the second cryptographic signature (sigA[NonceA||NonceB]) with a public device authentication key (e.g., using DAKA from cert-DAKA), and comparing the locally generated concatenation of the first nonce and the second nonce with the cryptographically verified concatenation of the first nonce and the second nonce. In addition to the error reporting message, when the image capture device 200 fails to validate the authentication datagram, the image capture device 200 may partially or completely disable the external device, and/or discontinue or restrict communications to/from the external device.

In some implementations, the roles of the image capture device 200 and external device, as described above, can be reversed. In some implementations, the external device and the image capture device are arranged according to a "master-slave" configuration, where the master (e.g., the external device) may be configured to authenticate the slave (e.g., the image capture device 200). In the event of a failed authentication, the master may at least partially disable or restrict communications to/from the unauthenticated slave. Alternatively, a failed authentication may result in both devices or a pseudo-secondary device being partially or completely disabled. For example, for enhanced security, the external device (e.g., IOM 104 or CCM 106) and the image capture device 200 can be disabled should they fail to successfully complete the authentication sequence.

Each of the industrial control system elements described herein may include circuitry and/or logic enabled to perform the functions described herein. For example, each industrial control system element (e.g., IOM 104, CCM, 106, image capture device 200, and so forth) may include a processor configured to execute program instructions stored permanently, semi-permanently, or temporarily by a non-transitory machine readable medium such as a hard disk drive (HDD), solid-state disk (SDD), optical disk, magnetic storage device, flash drive, or the like. Furthermore, as described above, the industrial control elements herein can be provisioned with unique security credentials, either when placed in use or at birth (e.g., at the site of manufacture) by the key management entity 124 (which may be the same key management entity for all industrial control system elements). These security credentials can be stored in secure memory of each device (e.g., in an encrypted memory). Moreover, authentication of any operator action, request, datagram, and the like can occur within the confines of each industrial control system element (e.g., using the embedded security credential(s) and processor of each element, rather than via an external authenticator). In this regard, intrinsic security can be implemented at each level/layer of the industrial control system 100.

It should be understood that any of the functions described herein can be implemented using hardware (e.g., fixed logic circuitry such as integrated circuits), software, firmware, manual processing, or a combination thereof. Thus, the blocks, operations, functions, or steps discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An image capture device for a secure industrial control system, comprising:
   an image sensor;
   a signal processor coupled to the image sensor; and
   a controller for managing the signal processor and transmitting data associated with processed image signals to at least one of an input/output module or a communications/control module via a communications interface that couples the controller to the at least one of the input/output module or the communications/control module, wherein the controller is configured to establish an encrypted tunnel between the controller and the at least one of the input/output module or the communications/control module based upon a unique security credential of the image capture device and a unique security credential of the at least one of the input/output module or the communications/control module,
wherein the image capture device is provisioned with the unique security credential at a point of manufacture of the image capture device by a key management entity, and
wherein the unique security credential of the image capture device is at least one of modifiable or revocable, by the at least one of the input/output module or the communications/control module.

2. The image capture device of claim 1, wherein the controller is further configured to perform an authentication sequence with the at least one of the input/output module or the communications/control module utilizing the at unique security credential of the image capture device and the unique security credential of the at least one of the input/output module or the communications/control module.

3. The image capture device of claim 1, wherein the security credential of the image capture device is at least one of modifiable, revocable, or authenticatable by the key management entity at a site different from the respective point of manufacture of the image capture device.

4. The image capture device of claim 1, wherein the unique security credential of the image capture device is authenticatable by the at least one of the input/output module or the communications/control module.

5. The image capture device of claim 1, wherein the communications interface is configured to connect the controller, via the at least one of the input/output module or the communications/control module, to a communications backplane including a serial communications interface and a parallel communications interface.

6. The image capture device of claim 5, wherein the communications interface comprises a Power Over Ethernet (POE) port for receiving power supplied by the at least one of the input/output module or the communications/control module.

7. The image capture device of claim 1, wherein the one or more processed image signals include spectral data detected by the image sensor.

8. The image capture device of claim 7, wherein the controller is configured to transmit the spectral data for monitoring one or more industrial control system environmental conditions including an environmental presence of one or more of: fire, dust, smoke, micro-particles, heat, moisture, elevated pressure, gas, or radiation.

9. A secure industrial control system, comprising:
a communications/control module provisioned with a first unique security credential;
an input/output module provisioned with a second unique security credential;
a communications backplane that physically and communicatively couples the communications/control module to the input/output module; and
an image capture device provisioned with a third unique security credential and comprising:
an image sensor;
a signal processor coupled to the image sensor; and
a controller for managing the signal processor and transmitting data associated with processed image signals to at least one of the input/output module or the communications/control module via a communications interface that couples the controller to the at least one of the input/output module or the communications/control module,
wherein the controller is configured to establish an encrypted tunnel between the controller and the at least one of the input/output module or the communications/control module based upon the third unique security credential of the image capture device and at least one of the first and second unique security credentials associated with the at least one of the input/output module or the communications/control module,
wherein the image capture device is provisioned with the third unique security credential at a point of manufacture of the image capture device from a key management entity, and
wherein the third unique security credential of the image capture device is at least one of modifiable or revocable by the at least one of the input/output module or the communications/control module.

10. The secure industrial control system of claim 9, wherein the controller is further configured to perform an authentication sequence with the at least one of the input/output module or the communications/control module based on the third unique security credential of the image capture device and at least one of the first and second unique security credentials associated with the at least one of the input/output module or the communications/control module.

11. The secure industrial control system of claim 9, wherein the third unique security credential of the image capture device is at least one of modifiable, revocable, or authenticatable by the key management entity at a site different from the respective point of manufacture.

12. The secure industrial control system of claim 9, wherein the third unique security credential of the image capture device is authenticatable by the at least one of the input/output module or the communications/control module.

13. The secure industrial control system of claim 9, wherein the communications interface is configured to connect the controller, via the at least one of the input/output module or the communications/control module, to the communications backplane, wherein the communications backplane includes a serial communications interface and a parallel communications interface.

14. The secure industrial control system of claim 13, wherein the communications interface comprises a Power Over Ethernet (POE) port for receiving power supplied by the at least one of the input/output module or the communications/control module.

15. The secure industrial control system of claim 9, wherein the one or more processed image signals include spectral data detected by the image sensor.

16. The secure industrial control system of claim 15, wherein the controller is configured to transmit the spectral data for monitoring one or more industrial control system environmental conditions including an environmental presence of one or more of: fire, dust, smoke, micro-particles, heat, moisture, elevated pressure, gas, or radiation.

17. The secure industrial control system of claim 9, wherein at least one of the communications/control module or the input/output module is configured to pre-process or post-process image signals received from the image capture device before transmitting the image signals to another industrial element of the secure industrial control system or a network connected device.

18. A secure industrial control system, comprising:
a communications/control module provisioned with a first unique security credential;
an input/output module provisioned with a second unique security credential;
a communications backplane that physically and communicatively couples the communications/control module to the input/output module, the communications backplane including a serial communications interface for connecting the input/output module to the communications/control module and a parallel communications interface configured for separately connecting the input/output module to the communications/control module; and an image capture device provisioned with a third unique security credential and comprising:
an image sensor;
a signal processor coupled to the image sensor; and
a controller for managing the signal processor and transmitting data associated with processed image signals to at least one of the input/output module or the communications/control module via a communications interface that couples the controller to the at least one of the input/output module or the communications/control module based upon the third unique security credential and at least one of the first and second unique security credentials associated with the at least one of the input/output module or the communications/control module,
wherein the image capture device is provisioned with the third unique security credential at a point of manufacture of the image capture device from a key management entity, and
wherein the third unique security credential of the image capture device is at least one of modifiable or revocable by the at least one of the input/output module or the communications/control module.

* * * * *